United States Patent
Waldern et al.

(10) Patent No.: US 11,573,483 B2
(45) Date of Patent: *Feb. 7, 2023

(54) SYSTEMS AND METHODS FOR MULTIPLYING THE IMAGE RESOLUTION OF A PIXELATED DISPLAY

(71) Applicant: DigiLens Inc., Sunnyvale, CA (US)

(72) Inventors: Jonathan David Waldern, Los Altos Hills, CA (US); Alastair John Grant, San Jose, CA (US); Milan Momcilo Popovich, Leicester (GB)

(73) Assignee: DigiLens Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,418

(22) Filed: Mar. 8, 2021

(65) Prior Publication Data
US 2021/0405514 A1     Dec. 30, 2021

Related U.S. Application Data

(63) Continuation of application No. 16/162,280, filed on Oct. 16, 2018, now Pat. No. 10,942,430.
(Continued)

(51) Int. Cl.
*G03B 21/14* (2006.01)
*H04N 13/332* (2018.01)
(Continued)

(52) U.S. Cl.
CPC .......... *G03B 21/147* (2013.01); *G02B 6/122* (2013.01); *G02B 27/0172* (2013.01);
(Continued)

(58) Field of Classification Search
CPC ................ G02B 27/0172; G02B 6/122; G02B 2027/0147; G02B 6/34; G02B 2027/0174;
(Continued)

(56) References Cited

U.S. PATENT DOCUMENTS

| 4,035,068 A | 7/1977 | Rawson |
| 4,765,703 A | 8/1988 | Suzuki et al. |

(Continued)

FOREIGN PATENT DOCUMENTS

| CN | 113692544 A | 11/2021 |
| CN | 114341729 A | 4/2022 |

(Continued)

OTHER PUBLICATIONS

International Preliminary Report on Patentability for International Application PCT/GB2009/051676, issued Jun. 14, 2011, dated Jun. 23, 2011, 6 pgs.
(Continued)

*Primary Examiner* — Magda Cruz
(74) *Attorney, Agent, or Firm* — KPPB LLP

(57) ABSTRACT

Systems integrating display resolution-multiplication solutions can be implemented in a variety of different ways. In many embodiments, the system includes an image projector for projecting image light, an image processor for computing a native image and at least one image shifted in a predefined direction, and at least one switchable grating capable of being switched between diffracting and non-diffracting states. In some embodiments, the switchable grating is optically coupled to the image projector. In a number of embodiments, the switchable gratings have a first configuration for propagating the native image light and at least one other configuration for propagating shifted image light having an angular displacement corresponding to the image shift in a predefined direction. By displaying the native and shifted images sequentially within a human eye integration period, the display resolution can be multiplied.

19 Claims, 8 Drawing Sheets

Related U.S. Application Data

(60) Provisional application No. 62/606,928, filed on Oct. 16, 2017.

(51) Int. Cl.
  *G02B 6/122* (2006.01)
  *G02B 27/01* (2006.01)
  *G02B 6/34* (2006.01)
  *G06F 3/01* (2006.01)
  *G06T 3/40* (2006.01)

(52) U.S. Cl.
  CPC ............ *G06F 3/013* (2013.01); *G06T 3/4053* (2013.01); *H04N 13/332* (2018.05); *G02B 6/34* (2013.01); *G02B 2027/0147* (2013.01); *G02B 2027/0174* (2013.01)

(58) Field of Classification Search
  CPC ........... G09G 3/007; G09G 2340/0407; H04N 13/332; G06T 3/4053; G03B 21/147; G06F 3/013
  See application file for complete search history.

(56) References Cited

U.S. PATENT DOCUMENTS

| | | |
|---|---|---|
| 4,964,701 A | 10/1990 | Dorschner et al. |
| 5,009,483 A | 4/1991 | Rockwell et al. |
| 5,099,343 A | 3/1992 | Margerum et al. |
| 5,119,454 A | 6/1992 | McMahon et al. |
| 5,148,302 A | 9/1992 | Nagano et al. |
| 5,224,198 A | 6/1993 | Jachimowicz et al. |
| 5,251,048 A | 10/1993 | Doane et al. |
| 5,264,950 A | 11/1993 | West et al. |
| 5,296,967 A | 3/1994 | Moskovich et al. |
| 5,309,283 A | 5/1994 | Kreitzer et al. |
| 5,313,330 A | 5/1994 | Betensky |
| 5,418,871 A | 5/1995 | Revelli et al. |
| 5,465,311 A | 11/1995 | Caulfield et al. |
| 5,532,875 A | 7/1996 | Betemsky |
| 5,621,529 A | 4/1997 | Gordon et al. |
| 5,706,136 A | 1/1998 | Okuyama et al. |
| 5,808,804 A | 9/1998 | Moskovich |
| 5,835,661 A | 11/1998 | Tai et al. |
| 5,841,587 A | 11/1998 | Moskovich et al. |
| 5,856,842 A | 1/1999 | Tedesco |
| 5,870,228 A | 2/1999 | Kreitzer et al. |
| 5,875,012 A | 2/1999 | Crawford et al. |
| 5,930,433 A | 7/1999 | Williamson et al. |
| 5,963,375 A | 10/1999 | Kreitzer |
| 5,986,746 A | 11/1999 | Metz et al. |
| 6,014,187 A | 1/2000 | Taketomi et al. |
| 6,133,971 A | 10/2000 | Silverstein et al. |
| 6,141,074 A | 10/2000 | Bos et al. |
| 6,169,594 B1 | 1/2001 | Aye et al. |
| 6,169,613 B1 | 1/2001 | Amitai et al. |
| 6,414,760 B1 | 7/2002 | Lopez et al. |
| 6,504,629 B1 | 1/2003 | Popovich et al. |
| 6,567,573 B1 | 5/2003 | Domash et al. |
| 6,577,429 B1 | 6/2003 | Kurtz et al. |
| 6,594,090 B2 | 7/2003 | Kruschwitz et al. |
| 6,597,475 B1 | 7/2003 | Shirakura et al. |
| 6,600,590 B2 | 7/2003 | Roddy et al. |
| 6,625,381 B2 | 9/2003 | Roddy et al. |
| 6,805,490 B2 | 10/2004 | Levola |
| 6,825,987 B2 | 11/2004 | Repetto et al. |
| 6,829,095 B2 | 12/2004 | Amitai |
| 6,833,955 B2 | 12/2004 | Niv |
| 6,847,488 B2 | 1/2005 | Travis |
| 7,009,773 B2 | 3/2006 | Chaoulov et al. |
| 7,068,405 B2 | 6/2006 | Sutherland et al. |
| 7,149,385 B2 | 12/2006 | Parikka et al. |
| 7,181,108 B2 | 2/2007 | Levola |
| 7,206,107 B2 | 4/2007 | Levola |
| 7,391,573 B2 | 6/2008 | Amitai |
| 7,418,170 B2 | 8/2008 | Mukawa et al. |
| 7,453,612 B2 | 11/2008 | Mukawa |
| 7,457,040 B2 | 11/2008 | Amitai |
| 7,499,217 B2 | 3/2009 | Cakmakci et al. |
| 7,577,326 B2 | 8/2009 | Amitai |
| 7,589,901 B2 | 9/2009 | DeJong et al. |
| 7,672,055 B2 | 3/2010 | Amitai |
| 7,672,549 B2 | 3/2010 | Ghosh et al. |
| 7,724,443 B2 | 5/2010 | Amitai |
| 7,740,387 B2 | 6/2010 | Schultz et al. |
| 7,747,113 B2 | 6/2010 | Mukawa et al. |
| 7,751,122 B2 | 7/2010 | Amitai |
| 7,751,662 B2 | 7/2010 | Kleemann et al. |
| 7,764,413 B2 | 7/2010 | Levola |
| 7,866,869 B2 | 1/2011 | Karakawa |
| 7,907,342 B2 | 3/2011 | Simmonds et al. |
| 7,949,214 B2 | 5/2011 | DeJong et al. |
| 7,969,657 B2 | 6/2011 | Cakmakci et al. |
| 8,000,020 B2 | 8/2011 | Amitai et al. |
| 8,018,579 B1 | 9/2011 | Krah |
| 8,023,783 B2 | 9/2011 | Mukawa et al. |
| 8,073,296 B2 | 12/2011 | Mukawa et al. |
| 8,098,439 B2 | 1/2012 | Amitai et al. |
| 8,107,023 B2 | 1/2012 | Simmonds et al. |
| 8,107,780 B2 | 1/2012 | Simmonds |
| 8,155,489 B2 | 4/2012 | Saarikko et al. |
| 8,160,411 B2 | 4/2012 | Levola et al. |
| 8,194,325 B2 | 6/2012 | Levola et al. |
| 8,213,065 B2 | 7/2012 | Mukawa |
| 8,213,755 B2 | 7/2012 | Mukawa et al. |
| 8,220,966 B2 | 7/2012 | Mukawa |
| 8,224,133 B2 | 7/2012 | Popovich et al. |
| 8,233,204 B1* | 7/2012 | Robbins ................ G02B 27/01 359/566 |
| 8,314,993 B2 | 11/2012 | Levola et al. |
| 8,320,032 B2 | 11/2012 | Levola |
| 8,325,166 B2 | 12/2012 | Akutsu et al. |
| 8,354,640 B2 | 1/2013 | Hamre et al. |
| 8,355,610 B2 | 1/2013 | Simmonds |
| 8,369,019 B2 | 2/2013 | Baker et al. |
| 8,376,548 B2 | 2/2013 | Schultz |
| 8,382,293 B2 | 2/2013 | Phillips, III et al. |
| 8,396,339 B2 | 3/2013 | Mukawa et al. |
| 8,422,840 B2 | 4/2013 | Large |
| 8,432,614 B2 | 4/2013 | Amitai |
| 8,466,953 B2 | 6/2013 | Levola et al. |
| 8,491,136 B2 | 7/2013 | Travis et al. |
| 8,493,662 B2 | 7/2013 | Noui |
| 8,547,638 B2 | 10/2013 | Levola |
| 8,548,290 B2 | 10/2013 | Travers et al. |
| 8,582,206 B2 | 11/2013 | Travis |
| 8,593,734 B2 | 11/2013 | Laakkonen |
| 8,611,014 B2 | 12/2013 | Valera et al. |
| 8,634,120 B2 | 1/2014 | Popovich et al. |
| 8,639,072 B2 | 1/2014 | Popovich et al. |
| 8,643,948 B2 | 2/2014 | Amitai et al. |
| 8,649,099 B2 | 2/2014 | Schultz et al. |
| 8,654,420 B2 | 2/2014 | Simmonds |
| 8,698,705 B2 | 4/2014 | Burke et al. |
| 8,731,350 B1 | 5/2014 | Lin et al. |
| 8,736,963 B2 | 5/2014 | Robbins et al. |
| 8,810,913 B2 | 8/2014 | Simmonds et al. |
| 8,810,914 B2 | 8/2014 | Amitai |
| 8,817,350 B1 | 8/2014 | Robbins et al. |
| 8,824,836 B2 | 9/2014 | Sugiyama et al. |
| 8,830,584 B2 | 9/2014 | Saarikko et al. |
| 8,842,368 B2 | 9/2014 | Simmonds et al. |
| 8,873,149 B2 | 10/2014 | Bohn et al. |
| 8,873,150 B2 | 10/2014 | Amitai |
| 8,903,207 B1 | 12/2014 | Brown et al. |
| 8,913,865 B1 | 12/2014 | Bennett |
| 8,917,453 B2 | 12/2014 | Bohn et al. |
| 8,985,803 B2 | 3/2015 | Bohn et al. |
| 8,989,535 B2 | 3/2015 | Robbins |
| 9,019,595 B2 | 4/2015 | Jain |
| 9,025,253 B2 | 5/2015 | Hadad et al. |
| 9,075,184 B2 | 7/2015 | Popovich et al. |
| 9,164,290 B2 | 10/2015 | Robbins et al. |
| 9,201,270 B2 | 12/2015 | Fattal et al. |

(56) References Cited

U.S. PATENT DOCUMENTS

| | | |
|---|---|---|
| 9,274,338 B2 | 3/2016 | Robbins et al. |
| 9,310,566 B2 | 4/2016 | Valera et al. |
| 9,341,846 B2 | 5/2016 | Popovich et al. |
| 9,372,347 B1 | 6/2016 | Levola et al. |
| 9,377,623 B2 | 6/2016 | Robbins et al. |
| 9,389,415 B2 | 7/2016 | Fattal et al. |
| 9,400,395 B2 | 7/2016 | Travers et al. |
| 9,423,360 B1 | 8/2016 | Kostamo et al. |
| 9,431,794 B2 | 8/2016 | Jain |
| 9,459,451 B2 | 10/2016 | Saarikko et al. |
| 9,465,213 B2 | 10/2016 | Simmonds |
| 9,494,799 B2 | 11/2016 | Robbins et al. |
| 9,551,874 B2 | 1/2017 | Amitai et al. |
| 9,551,880 B2 | 1/2017 | Amitai et al. |
| 9,612,403 B2 | 4/2017 | Abovitz et al. |
| 9,651,368 B2 | 5/2017 | Abovitz et al. |
| 9,664,824 B2 | 5/2017 | Simmonds et al. |
| 9,727,772 B2 | 8/2017 | Popovich et al. |
| 9,746,688 B2 | 8/2017 | Popovich et al. |
| 10,942,430 B2* | 3/2021 | Waldern .............. G02B 27/0172 |
| 11,204,540 B2 | 12/2021 | Popovich et al. |
| 11,231,544 B2* | 1/2022 | Lin ........................... G02B 6/00 |
| 11,307,432 B2 | 4/2022 | Popovich et al. |
| 2002/0047837 A1 | 4/2002 | Suyama et al. |
| 2003/0067685 A1 | 4/2003 | Niv |
| 2004/0004767 A1 | 1/2004 | Song |
| 2004/0141217 A1 | 7/2004 | Endo et al. |
| 2005/0180687 A1 | 8/2005 | Amitai |
| 2005/0232530 A1 | 10/2005 | Kekas et al. |
| 2006/0181683 A1* | 8/2006 | Bhowmik .............. G09G 3/007 353/30 |
| 2007/0041684 A1 | 2/2007 | Popovich et al. |
| 2008/0198471 A1 | 8/2008 | Amitai |
| 2008/0285137 A1 | 11/2008 | Simmonds et al. |
| 2008/0297731 A1 | 12/2008 | Powell et al. |
| 2009/0052047 A1 | 2/2009 | Amitai |
| 2009/0128495 A1 | 5/2009 | Kong et al. |
| 2009/0141324 A1 | 6/2009 | Mukawa |
| 2009/0190222 A1 | 7/2009 | Simmonds et al. |
| 2009/0303599 A1 | 12/2009 | Levola |
| 2010/0039796 A1 | 2/2010 | Mukawa |
| 2010/0053565 A1 | 3/2010 | Mizushima et al. |
| 2010/0097674 A1 | 4/2010 | Kasazumi et al. |
| 2010/0246003 A1 | 9/2010 | Simmonds et al. |
| 2010/0246004 A1 | 9/2010 | Simmonds |
| 2010/0284085 A1 | 11/2010 | Laakkonen |
| 2010/0284090 A1 | 11/2010 | Simmonds et al. |
| 2010/0284180 A1 | 11/2010 | Popovich et al. |
| 2010/0321781 A1 | 12/2010 | Levola et al. |
| 2011/0026128 A1 | 2/2011 | Baker et al. |
| 2011/0032706 A1 | 2/2011 | Mukawa |
| 2011/0063604 A1 | 3/2011 | Hamre et al. |
| 2011/0235179 A1 | 9/2011 | Simmonds |
| 2011/0242661 A1 | 10/2011 | Simmonds |
| 2011/0242670 A1 | 10/2011 | Simmonds |
| 2012/0033306 A1 | 2/2012 | Valera et al. |
| 2012/0044572 A1 | 2/2012 | Simmonds et al. |
| 2012/0062850 A1 | 3/2012 | Travis |
| 2012/0081789 A1 | 4/2012 | Mukawa et al. |
| 2012/0120493 A1 | 5/2012 | Simmonds et al. |
| 2012/0206811 A1 | 8/2012 | Mukawa et al. |
| 2012/0207432 A1 | 8/2012 | Travis et al. |
| 2012/0207434 A1 | 8/2012 | Large et al. |
| 2012/0300311 A1 | 11/2012 | Simmonds et al. |
| 2013/0016324 A1 | 1/2013 | Travis |
| 2013/0021392 A1 | 1/2013 | Travis |
| 2013/0021586 A1 | 1/2013 | Lippey |
| 2013/0039619 A1 | 2/2013 | Laughlin et al. |
| 2013/0044376 A1 | 2/2013 | Valera et al. |
| 2013/0077049 A1 | 3/2013 | Bohn |
| 2013/0163089 A1 | 6/2013 | Bohn et al. |
| 2013/0229717 A1 | 9/2013 | Amitai |
| 2013/0250430 A1 | 9/2013 | Robbins et al. |
| 2013/0250431 A1 | 9/2013 | Robbins et al. |
| 2013/0271731 A1 | 10/2013 | Popovich et al. |
| 2013/0322810 A1 | 12/2013 | Robbins |
| 2014/0003762 A1 | 1/2014 | Macnamara |
| 2014/0104665 A1* | 4/2014 | Popovich .......... G02B 27/0103 359/15 |
| 2014/0140653 A1* | 5/2014 | Brown ................ G02B 6/0076 385/10 |
| 2014/0140654 A1* | 5/2014 | Brown ................ G02B 5/1814 385/10 |
| 2014/0168735 A1 | 6/2014 | Yuan et al. |
| 2014/0185286 A1 | 7/2014 | Popovich et al. |
| 2014/0218801 A1 | 8/2014 | Simmonds et al. |
| 2014/0232759 A1 | 8/2014 | Simmonds et al. |
| 2014/0240834 A1 | 8/2014 | Mason et al. |
| 2014/0267420 A1 | 9/2014 | Schowengerdt et al. |
| 2014/0300966 A1 | 10/2014 | Travers et al. |
| 2015/0010265 A1 | 1/2015 | Popovich et al. |
| 2015/0125109 A1 | 5/2015 | Robbins et al. |
| 2015/0185475 A1 | 7/2015 | Saarikko et al. |
| 2015/0260994 A1 | 9/2015 | Akutsu et al. |
| 2015/0277375 A1 | 10/2015 | Large et al. |
| 2015/0285682 A1* | 10/2015 | Popovich ............. G02B 5/1842 250/349 |
| 2016/0004090 A1 | 1/2016 | Popovich et al. |
| 2016/0077338 A1 | 3/2016 | Robbins et al. |
| 2016/0085300 A1 | 3/2016 | Robbins et al. |
| 2016/0116739 A1 | 4/2016 | TeKolste et al. |
| 2016/0231570 A1* | 8/2016 | Levola ................ G02B 6/0035 |
| 2016/0320536 A1 | 11/2016 | Simmonds et al. |
| 2016/0327705 A1 | 11/2016 | Simmonds et al. |
| 2016/0341964 A1 | 11/2016 | Amitai et al. |
| 2017/0031171 A1 | 2/2017 | Vallius et al. |
| 2017/0034435 A1 | 2/2017 | Vallius et al. |
| 2017/0102543 A1 | 4/2017 | Vallius et al. |
| 2017/0123208 A1 | 5/2017 | Vallius et al. |
| 2017/0131546 A1 | 5/2017 | Woltman et al. |
| 2017/0131551 A1 | 5/2017 | Robbins et al. |
| 2017/0219841 A1 | 8/2017 | Popovich et al. |
| 2017/0270637 A1* | 9/2017 | Perreault .......... H04N 5/23232 |
| 2017/0299860 A1 | 10/2017 | Juhola et al. |
| 2018/0188542 A1* | 7/2018 | Waldern ............. G02B 27/0172 |
| 2018/0284440 A1* | 10/2018 | Popovich ........... G02B 27/0179 |
| 2019/0243209 A1 | 8/2019 | Perreault et al. |
| 2021/0349328 A1 | 11/2021 | Popovich et al. |
| 2021/0405299 A1 | 12/2021 | Grant et al. |
| 2022/0075242 A1 | 3/2022 | Popovich et al. |
| 2022/0187692 A1 | 6/2022 | Popovich et al. |
| 2022/0244559 A1 | 8/2022 | Popovich et al. |
| 2022/0283377 A1 | 9/2022 | Popovich et al. |

FOREIGN PATENT DOCUMENTS

| | | |
|---|---|---|
| EP | 0795775 A2 | 9/1997 |
| EP | 1748305 A1 | 1/2007 |
| EP | 2110701 A1 | 10/2009 |
| EP | 1828832 B1 | 5/2013 |
| EP | 2733517 A1 | 5/2014 |
| EP | 1573369 B1 | 7/2014 |
| EP | 2995986 A1 | 3/2016 |
| EP | 3924759 A1 | 12/2021 |
| EP | 4004646 A1 | 6/2022 |
| GB | 2508661 A | 6/2014 |
| GB | 2514658 A | 12/2014 |
| JP | 2000056259 A | 2/2000 |
| JP | 2000267042 A | 9/2000 |
| JP | 2002162598 A | 6/2002 |
| JP | 2009036955 A | 2/2009 |
| JP | 2011164545 A | 8/2011 |
| JP | 2022520472 A | 3/2022 |
| KR | 1020210138609 A | 11/2021 |
| KR | 1020220038452 A | 3/2022 |
| TW | 201314263 A | 4/2013 |
| WO | 2000016136 A1 | 3/2000 |
| WO | 2000023847 | 4/2000 |
| WO | 2002082168 A1 | 10/2002 |
| WO | 2003081320 A1 | 10/2003 |
| WO | 2005073798 A1 | 8/2005 |
| WO | 2006064301 A1 | 6/2006 |
| WO | 2006064325 A1 | 6/2006 |

(56) References Cited

FOREIGN PATENT DOCUMENTS

| WO | 2006064334 A1 | 6/2006 |
|---|---|---|
| WO | 2006102073 A2 | 9/2006 |
| WO | 2006132614 A1 | 12/2006 |
| WO | 2006102073 A3 | 1/2007 |
| WO | 2007029032 A1 | 3/2007 |
| WO | 2007141587 A1 | 12/2007 |
| WO | 2007141589 A1 | 12/2007 |
| WO | 2009013597 A2 | 1/2009 |
| WO | 2009077802 A1 | 6/2009 |
| WO | 2010023444 A1 | 3/2010 |
| WO | 2010067114 A1 | 6/2010 |
| WO | 2010104692 A2 | 9/2010 |
| WO | 2010122330 A1 | 10/2010 |
| WO | 2010125337 A2 | 11/2010 |
| WO | 2011042711 A2 | 4/2011 |
| WO | 2011051660 A1 | 5/2011 |
| WO | 2011073673 A1 | 6/2011 |
| WO | 2011107831 A1 | 9/2011 |
| WO | 2011131978 A1 | 10/2011 |
| WO | 2013102759 A2 | 7/2013 |
| WO | 2014080155 A1 | 5/2014 |
| WO | 2014091200 A1 | 6/2014 |
| WO | 2014100182 A1 | 6/2014 |
| WO | 2014116615 A1 | 7/2014 |
| WO | 2014159621 A1 | 10/2014 |
| WO | 2014210349 A1 | 12/2014 |
| WO | 2015069553 A1 | 5/2015 |
| WO | 2015145119 A1 | 10/2015 |
| WO | 2016020643 A1 | 2/2016 |
| WO | 2016111707 A1 | 7/2016 |
| WO | 2016111708 A1 | 7/2016 |
| WO | 2016111709 A1 | 7/2016 |
| WO | 2016113533 A2 | 7/2016 |
| WO | 2016113534 A1 | 7/2016 |
| WO | 2016122679 A1 | 8/2016 |
| WO | 2017060665 A1 | 4/2017 |
| WO | 2017162999 A1 | 9/2017 |
| WO | 2017180403 A1 | 10/2017 |

OTHER PUBLICATIONS

International Preliminary Report on Patentability for International Application PCT/GB2011/000349, issued Sep. 18, 2012, dated Sep. 27, 2012, 10 pgs.
International Preliminary Report on Patentability for International Application PCT/GB2012/000677, issued Feb. 25, 2014, dated Mar. 6, 2014, 5 pgs.
International Preliminary Report on Patentability for International Application PCT/US2014/011736, issued Jul. 21, 2015, dated Jul. 30, 2015, 9 pgs.
International Search Report and Written Opinion for International Application No. PCT/US2014/011736, completed Apr. 18, 2014, dated May 8, 2014, 10 pgs.
International Search Report and Written Opinion for International Application PCT/GB2009/051676, completed May 10, 2010, dated May 18, 2010, 7 pgs.
International Search Report for PCT/GB2011/000349, completed by the European Patent Office on Aug. 17, 2011, 4 pgs.
International Search Report for PCT/GB2012/000677, completed by the European Patent Office on Dec. 10, 2012, 4 pgs.
Written Opinion for International Application No. PCT/GB2011/000349, completed Aug. 17, 2011, dated Aug. 25, 2011, 9 pgs.
Written Opinion for International Application No. PCT/GB2012/000677, completed Dec. 10, 2012, dated Dec. 17, 2012, 4 pgs.
"BragGrate—Deflector: Transmitting Volume Bragg Grating for angular selection and magnification", 2015, www.OptiGrate.com.
Al-Kalbani et al., "Ocular Microtremor laser speckle metrology", Proc. of SPIE, 2009, vol. 7176 717606-1, 12 pgs.
An et al., "Speckle suppression in laser display using several partially coherent beams", Optics Express, Jan. 5, 2009, vol. 17, No. 1, pp. 92-103.
Ayras et al., "Exit pupil expander with a large field of view based on diffractive optics", Journal of the SID, May 18, 2009, 17/8, pp. 659-664.
Bleha et al. W P., "D-ILA Technology for High Resolution Projection Displays", Sep. 10, 2003, Proceedings, vol. 5080, doi: 10.1117/12.497532, 11 pgs.
Bone, "Design Obstacles for LCOS Displays in Projection Applications "Optics architectures for LCOS are still evolving"", Aurora Systems Inc. Bay Area SID Seminar, Mar. 27, 2001, 22 pgs.
Bowley et al., "Variable-wavelength switchable Bragg gratings formed in polymer-dispersed liquid crystals", Applied Physics Letters, Jul. 2, 2001, vol. 79, No. 1, pp. 9-11.
Brown, "Waveguide Displays", Rockwell Collins, 2015, 11 pgs.
Buckley, "Colour holographic laser projection technology for heads-up and instrument cluster displays", Conference: Proc. SID Conference 14th Annual Symposium on Vehicle Displays, Jan. 2007, 5 pgs.
Buckley et al., "Full colour holographic laser projector HUD", Light Blue Optics Ltd. Aug. 10, 2015, 5 pgs.
Ducharme, "Microlens diffusers for efficient laser speckle generation", Optics Express, Oct. 29, 2007, vol. 15, No. 22, pp. 14573-14579.
Funayama et al., "Proposal of a new type thin film light-waveguide display device using", The International Conference on Electrical Engineering, 2008, No. P-044, 5 pgs.
Han et al., "Study of Holographic Waveguide Display System", Advanced Photonics for Communications, 2014, 4 pgs.
Hoepfner et al., "LED Front Projection Goes Mainstream", Luminus Devices, Inc. Projection Summit, 2008, 18 pgs.
Karp et al., "Planar micro-optic solar concentration using multiple imaging lenses into a common slab waveguide", Proc. of SPIE vol. 7407, 2009 SPIE, CCC code: 0277-786X/09, doi: 10.1117/12.826531, pp. 74070D-1-74070D-11.
Karp et al., "Planar micro-optic solar concentrator", Optics Express, Jan. 18, 2010, vol. 18, No. 2, pp. 1122-1133.
Keuper et al., "26.1: RGB LED Illuminator for Pocket-Sized Projectors", SID 04 Digest, 2004, ISSN/0004-0966X/04/3502, pp. 943-945.
Keuper et al., "P-126: Ultra-Compact LED based Image Projector for Portable Applications", SID 03 Digest, 2003, ISSN/0003-0966X/03/3401-0713, pp. 713-715.
Li et al., "Dual Paraboloid Reflector and Polarization Recycling Systems for Projection Display", Proceedings vol. 5002, Projection Displays IX, Mar. 28, 2003, doi: 10.1117/12.479585, 12 pgs.
Li et al., "Novel Projection Engine with Dual Paraboloid Reflector and Polarization Recovery Systems", Wavien Inc. SPIE EI 5289-38, Jan. 21, 2004, 49 pgs.
Li et al., "Polymer crystallization/melting induced thermal switching in a series of holographically patterned Bragg reflectors", Soft Matter, Jul. 11, 2005, vol. 1, pp. 238-242.
Lu et al., "Polarization switch using thick holographic polymer-dispersed liquid crystal grating", Journal of Applied Physics, Feb. 1, 2004, vol. 95, No. 3, pp. 810-815.
Mach et al., "Switchable Bragg diffraction from liquid crystal in colloid-templated structures", Europhysics Letters, Jun. 1, 2002, vol. 58, No. 5, pp. 679-685.
Miller, "Coupled Wave Theory and Waveguide Applications", The Bell System Technical Journal, Short Hills, NJ, Feb. 2, 1954, 166 pgs.
Paolini et al., "High-Power LED Illuminators in Projection Displays", Lumileds, Aug. 7, 2001, 19 pgs.
Qi et al., "P-111: Reflective Display Based on Total Internal Reflection and Grating-Grating Coupling", Society for Information Display Digest, May 2003, pp. 648-651, DOI: 10.1889/1.1832359.
Schreiber et al., "Laser display with single-mirror MEMS scanner", Journal of the SID 17/7, 2009, pp. 591-595.
Sutherland et al., "Bragg Gratings in an Acrylate Polymer Consisting of Periodic Polymer-Dispersed Liquid-Crystal Planes", Chem. Mater. 1993, vol. 5, pp. 1533-1538.
Sutherland et al., "Electrically switchable volume gratings in polymer-dispersed liquid crystals", Applied Physics Letters, Feb. 28, 1994, vol. 64, No. 9, pp. 1074-1076.

(56) References Cited

OTHER PUBLICATIONS

Sutherland et al., "Enhancing the electro-optical properties of liquid crystal nanodroplets for switchable Bragg gratings", Proc. of SPIE, 2008, vol. 7050, pp. 705003-1-705003-9, doi: 10.1117/12.792629.
Sutherland et al., "Liquid crystal bragg gratings: dynamic optical elements for spatial light modulators", Hardened Materials Branch, Hardened Materials Branch, AFRL-ML-WP-TP-2007-514, Jan. 2007, Wright-Patterson Air Force Base, OH, 18 pgs.
Trisnadi, "Speckle contrast reduction in laser projection displays", Proc. SPIE 4657, 2002, 7 pgs.
Vita, "Switchable Bragg Gratings", Thesis, Universita degli Studi di Napoli Federico II, Nov. 2005, 103 pgs.
Wang et al., "Liquid-crystal blazed-grating beam deflector", Applied Optics, Dec. 10, 2000, vol. 39, No. 35, pp. 6545-6555.
Wofford et al., "Liquid crystal bragg gratings: dynamic optical elements for spatial light modulators", Hardened Materials Branch, Survivability and Sensor Materials Division, AFRL-ML-WP-TP-2007-551, Air Force Research Laboratory, Jan. 2007, Wright-Patterson Air Force Base, OH, 17 pgs.
Yaqoob et al., "High-speed two-dimensional laser scanner based on Bragg grating stored in photothermorefractive glass", Applied Optics, Sep. 10, 2003, vol. 42, No. 26, pp. 5251-5262.
Yeralan et al., "Switchable Bragg grating devices for telecommunications applications", Opt. Eng. Aug. 2012, vol. 41, No. 8, pp. 1774-1779.
International Preliminary Report on Patentability for International Application PCT/US2019/047097 issued Sep. 28, 2021, dated Nov. 4, 2021, 7 pgs.
International Preliminary Report on Patentability for International Application PCT/US2020/044060, Report issued Feb. 1, 2022, dated Feb. 10, 2022, 07 Pgs.

\* cited by examiner

SYSTEMS AND METHODS FOR MULTIPLYING THE IMAGE RESOLUTION OF A PIXELATED DISPLAY

CROSS-REFERENCE TO RELATED APPLICATIONS

The current application is a continuation of U.S. patent application Ser. No. 16/162,280 entitled "SYSTEMS AND METHODS FOR MULTIPLYING THE IMAGE RESOLUTION OF A PIXELATED DISPLAY," filed Oct. 16, 2018, which claims the benefit of and priority under 35 U.S.C. § 119(e) to U.S. Provisional Patent Application No. 62/606,928 entitled "METHOD AND APPARATUS FOR MULTIPLYING THE IMAGE RESOLUTION OF A PIXELATED DISPLAY," filed Oct. 16, 2017, the disclosures of which are hereby incorporated by reference in their entireties.

FIELD OF THE INVENTION

The present invention generally relates to displays and, more specifically, to holographic devices for multiplying the resolution of pixelated displays.

BACKGROUND

Waveguides can be referred to as structures with the capability of confining and guiding waves (i.e., restricting the spatial region in which waves can propagate). One subclass includes optical waveguides, which are structures that can guide electromagnetic waves, typically those in the visible spectrum. Waveguide structures can be designed to control the propagation path of waves using a number of different mechanisms. For example, planar waveguides can be designed to utilize diffraction gratings to diffract and couple incident light into the waveguide structure such that the in-coupled light can proceed to travel within the planar structure via total internal reflection ("TIR").

Fabrication of waveguides can include the use of material systems that allow for the recording of holographic optical elements within the waveguides. One class of such material includes polymer dispersed liquid crystal ("PDLC") mixtures, which are mixtures containing photopolymerizable monomers and liquid crystals. A further subclass of such mixtures includes holographic polymer dispersed liquid crystal ("HPDLC") mixtures. Holographic optical elements, such as volume phase gratings, can be recorded in such a liquid mixture by illuminating the material with two mutually coherent laser beams. During the recording process, the monomers polymerize and the mixture undergoes a photopolymerization-induced phase separation, creating regions densely populated by liquid crystal micro-droplets, interspersed with regions of clear polymer. The alternating liquid crystal-rich and liquid crystal-depleted regions form the fringe planes of the grating.

Waveguide optics, such as those described above, can be considered for a range of display and sensor applications. In many applications, waveguides containing one or more grating layers encoding multiple optical functions can be realized using various waveguide architectures and material systems, enabling new innovations in near-eye displays for augmented reality ("AR") and virtual reality ("VR"), compact heads-up displays ("HUDs") for aviation and road transport, and sensors for biometric and laser radar ("LIDAR") applications.

SUMMARY OF THE INVENTION

One embodiment includes an apparatus for multiplying display resolution, the apparatus including an image projector for directing light from pixels of a pixelated image source into unique angular directions, an image processor for computing a native image and at least one image shift in a predefined direction for sequential display by the image projector, and at least one switchable grating switchable between diffracting and non-diffracting states optically coupled to the image projector, wherein the at least one switchable grating have a first configuration for propagating the light of the native image and at least one configuration for propagating the light of the shifted image with an angular displacement corresponding to the image shift in the predefined direction.

In another embodiment, the at least one switchable grating is disposed within at least one waveguide.

In a further embodiment, the at least one switchable grating includes first, second, third, fourth gratings, wherein the first grating overlaps the third grating and the second grating overlaps the fourth grating, wherein the first and third gratings act as input couplers and the second and fourth gratings act as output couplers, wherein the first configuration is provided by one of the first or third gratings and one of the second or fourth gratings in their diffracting states, and wherein the at least one configuration for propagating shifted image light are provided by at least one other combination of diffracting states of the first, second, third, and fourth gratings.

In still another embodiment, the first and second gratings are disposed in a first layer within a waveguide and the third and fourth gratings are disposed in a second layer within the waveguide.

In a still further embodiment, the at least one switchable grating includes first and second gratings disposed in a first waveguide and third and fourth gratings disposed in a second waveguide, wherein the first grating overlaps the third grating and the second grating overlaps the fourth grating, wherein the first and third gratings act as input couplers and the second and fourth gratings act as output couplers, wherein the first configuration is provided when the first and second gratings are in their diffracting states, and wherein the second configuration is provided when the first and second gratings are in their non-diffracting states.

In yet another embodiment, the image shift is equal to $N+\frac{1}{2}$ times a pixel dimension, where N is an integer.

In a yet further embodiment, the native and shifted images are sequentially displayed within a human eye integration period.

In another additional embodiment, the image shift is one of vertical or horizontal shifts.

In a further additional embodiment, the at least one image shift includes vertical and horizontal shifts.

In another embodiment again, the switchable gratings are recorded in a holographic polymer dispersed, switchable Bragg grating.

In a further embodiment again, the at least one switchable grating is disposed in a waveguide further including a non-switching grating.

In still yet another embodiment, the at least one switchable grating is disposed in a waveguide further including a fold grating.

In a still yet further embodiment, at least one switchable grating includes at least one grating multiplexing at least one of wavelength or angular bandwidth.

In still another additional embodiment, the apparatus forms part of a HMD, a HUD, an eye-slaved display, a dynamic focus display, or a light field display.

In a still further additional embodiment, the image projector further includes a microdisplay panel.

In still another embodiment again, the image projector is optically coupled to the first grating and the third grating by one of a prism or grating.

In a still further embodiment again, the apparatus further includes an illumination homogenizer.

In yet another additional embodiment, at least one of the gratings is a rolled k-vector grating.

In a yet further additional embodiment, the waveguide further includes an input coupler, a fold grating, and an output coupler.

Yet another embodiment again includes a method of multiplying the resolution of a waveguide display, the method including providing an image projector and an image processor, providing a waveguide containing first, second, third and fourth switchable gratings with the first and third gratings substantially overlapping and the second and fourth gratings substantially overlapping, wherein each grating have an optical prescription for applying an angular shift to incident light, selecting pixel shift (N+½) multiplied by P, where N is an integer greater than or equal to zero and P is a pixel dimension, computing a shifted image using the image processor, writing a shifted image to the image projector, switching one of the first and third switchable gratings and one of the second and fourth switchable gratings into their diffracting states, coupling shifted image light into the waveguide via the diffracting first or third switchable gratings, coupling image light out of the waveguide via the diffracting second or fourth switchable gratings with a pixel shift determined by the prescriptions of the diffracting switchable gratings.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as exemplary embodiments of the invention and should not be construed as a complete recitation of the scope of the invention.

DETAILED DESCRIPTION

Figure 1A:
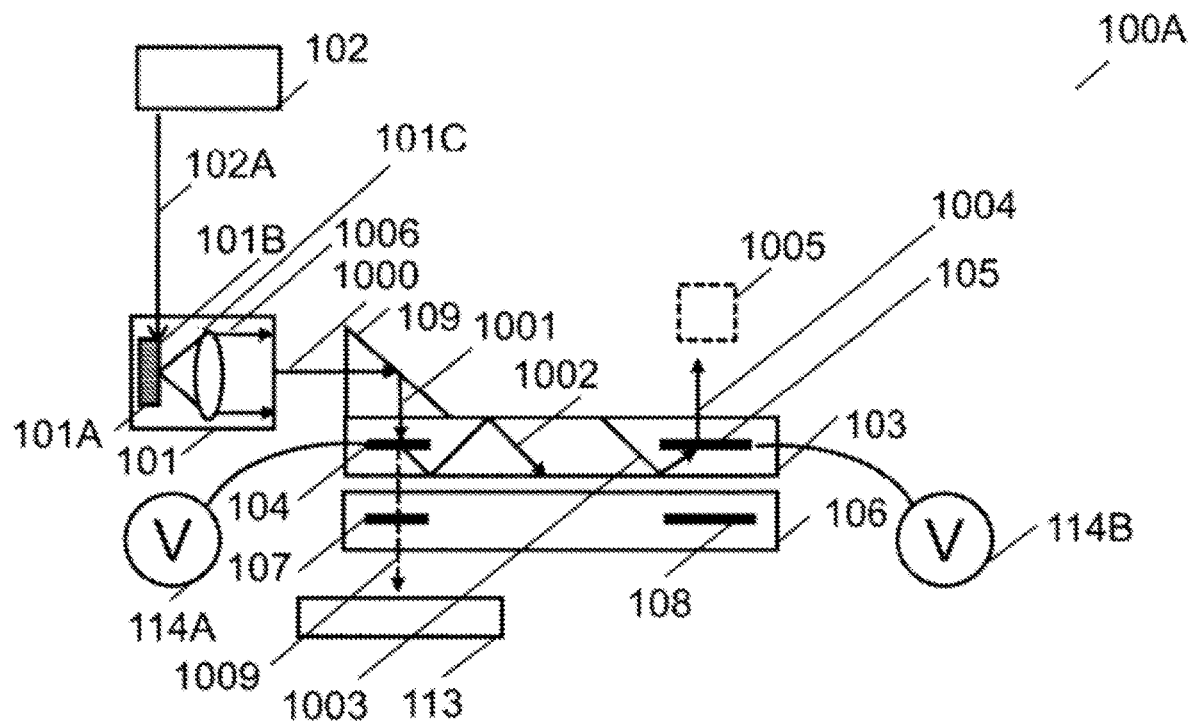
FIGS. 1A and 1B conceptually illustrate schematic cross-sectional views of two operational states of a resolution-multiplication waveguide device in accordance with an embodiment of the invention.

For the purposes of describing embodiments, some well-known features of optical technology known to those skilled in the art of optical design and visual displays have been omitted or simplified in order to not obscure the basic principles of the invention. Unless otherwise stated the term "on-axis" in relation to a ray or a beam direction refers to propagation parallel to an axis normal to the surfaces of the optical components described in relation to the invention. In the following description the terms light, ray, beam, and direction may be used interchangeably and in association with each other to indicate the direction of propagation of electromagnetic radiation along rectilinear trajectories. The term light and illumination may be used in relation to the visible and infrared bands of the electromagnetic spectrum. Parts of the following description will be presented using terminology commonly employed by those skilled in the art of optical design. As used herein, the term grating may encompass a grating comprised of a set of gratings in some embodiments. For illustrative purposes, it is to be understood that the drawings are not drawn to scale unless stated otherwise.

Turning now to the drawings, systems and methods for multiplying display resolution relating to near-eye display or head up display systems in accordance with various embodiments of the invention are illustrated. Waveguide optics can be considered for a range of display and sensor applications, such as but not limited to AR, VR, HUDs, LIDAR applications. Different applications can have different requirements in terms of performance, form factor, and cost of manufacturing. There is a growing consensus that the prerequisite for a successful head mounted AR display is a small, low impact form factor, high brightness, and wide field of view ("FOV") display with high enough resolution to fill the FOV with image detail. In many cases, it can be desirable to have a 50-degree FOV display supported by a resolution of at least 1080p (1920×1080 pixels in 16:9 aspect ratio HD Widescreen standard). To meet certain wearable form factor demands, the microdisplay used to provide the input image should conform to certain dimensions. For many applications, the microdisplay should not be greater than 0.23-inches diagonal. However, current pixel sizes typically do not permit 1080p pixel resolution into such a small display area. One way of overcoming the FOV/resolution bottleneck includes the use of image resolution-multiplication. One well-established technique pioneered by Texas Instruments in their rear projection TVs combines a fast switching DLP technology with a high-speed mechanical mirror to enable pixel doubling in order to attain 1080p resolution. However, such solutions are unsuited for AR wearables, both in terms of form factor and industry resistance to mechanical complexity and cost. Alternative technologies such as organic LED are not mature enough to deliver 1080p resolution with high brightness cost-effectively. To address these issues, many embodiments of the invention are directed towards compact, optically efficient, and cost-effective solutions for display resolution-multiplication and the integration of such solutions within waveguide displays.

Systems integrating display resolution-multiplication solutions can be implemented in a variety of different ways. In many embodiments, the system includes an image projector for projecting image light, an image processor for computing a native image and at least one image shifted in a predefined direction, and at least one switchable grating capable of being switched between diffracting and non-diffracting states. In further embodiments, the switchable grating is a Switchable Bragg Grating ("SBG") implemented in a resolution-multiplication waveguide. SBGs can be implemented in waveguides to reduce the thickness and the number of layers in the system when compared to conventional systems. SBGs can also be implemented to increase the field of view by tiling images presented sequentially on a microdisplay. In some embodiments, the switchable grating is optically coupled to the image projector. In a number of embodiments, the switchable gratings have a first configuration for propagating the native image light and at least one other configuration for propagating shifted image light having an angular displacement corresponding to the image shift in a predefined direction. By displaying the native and shifted images sequentially within a human eye integration period, the display resolution can be multiplied. Holographic waveguide technologies and display resolution-multiplication solutions are discussed below in further detail.

Switchable Bragg Gratings

Holographic waveguide technology can be advantageously implemented in waveguides for helmet-mounted displays or head-mounted displays ("HMDs") and heads-up displays for many applications, including but not limited to military applications and consumer applications (e.g., augmented reality glasses, etc.). In a number of embodiments, a larger exit pupil can be created by using fold gratings in conjunction with conventional gratings to provide pupil expansion on a single waveguide in both the horizontal and vertical directions, allowing for the preservation of eye box size while reducing lens size. Using the systems and methods disclosed herein, a single optical waveguide substrate can generate a wider field of view compared to current waveguide systems. In such embodiments, diffraction gratings can be used to split and diffract light rays into several beams that travel in different directions, thereby dispersing the light rays.

Optical structures recorded in waveguides can include many different types of optical elements, such as but not limited to diffraction gratings. In many embodiments, the grating implemented is a Bragg grating (also referred to as a volume grating). Bragg gratings can have high efficiency with little light being diffracted into higher orders. The relative amount of light in the diffracted and zero order can be varied by controlling the refractive index modulation of the grating, a property that is can be used to make lossy waveguide gratings for extracting light over a large pupil. One class of gratings used in holographic waveguide devices is the Switchable Bragg Grating. SBGs can be fabricated by first placing a thin film of a mixture of photopolymerizable monomers and liquid crystal material between glass plates or substrates. In many cases, the glass plates are in a parallel configuration. One or both glass plates can support electrodes, typically transparent tin oxide films, for applying an electric field across the film. The grating structure in an SBG can be recorded in the liquid material (often referred to as the syrup) through photopolymerization-induced phase separation using interferential exposure with a spatially periodic intensity modulation. Factors such as but not limited to control of the irradiation intensity, component volume fractions of the materials in the mixture, and exposure temperature can determine the resulting grating morphology and performance. As can readily be appreciated, a wide variety of materials and mixtures can be used depending on the specific requirements of a given application. In many embodiments, HPDLC material is used. During the recording process, the monomers polymerize and the mixture undergoes a phase separation. The LC molecules aggregate to form discrete or coalesced droplets that are periodically distributed in polymer networks on the scale of optical wavelengths. The alternating liquid crystal-rich and liquid crystal-depleted regions form the fringe planes of the grating, which can produce Bragg diffraction with a strong optical polarization resulting from the orientation ordering of the LC molecules in the droplets.

The resulting volume phase grating can exhibit very high diffraction efficiency, which can be controlled by the magnitude of the electric field applied across the film. When an electric field is applied to the grating via transparent electrodes, the natural orientation of the LC droplets can change, causing the refractive index modulation of the fringes to lower and the hologram diffraction efficiency to drop to very low levels. Typically, the electrodes are configured such that the applied electric field will be perpendicular to the substrates. In a number of embodiments, the electrodes are fabricated from indium tin oxide ("ITO"). In the OFF state with no electric field applied, the extraordinary axis of the liquid crystals generally aligns normal to the fringes (i.e., parallel to the grating or K-vector). The grating thus exhibits high refractive index modulation and high diffraction efficiency for P-polarized light (i.e., light with a polarization vector in the plane of incidence), but have nearly zero diffraction efficiency for S polarized light (i.e., light with the polarization vector normal to the plane of incidence). When an electric field is applied to the HPDLC, the grating switches to the ON state wherein the extraordinary axes of the liquid crystal molecules align parallel to the applied field and hence perpendicular to the substrate. In the ON state, the grating exhibits lower refractive index modulation and lower diffraction efficiency for both S- and P-polarized light. Thus, the grating region no longer diffracts light. Each grating region can be divided into a multiplicity of grating elements such as for example a pixel matrix according to the function of the HPDLC device. Typically, the electrode on one substrate surface is uniform and continuous, while electrodes on the opposing substrate surface are patterned in accordance to the multiplicity of selectively switchable grating elements.

Typically, the SBG elements are switched clear in 30 µs with a longer relaxation time to switch ON. Note that the diffraction efficiency of the device can be adjusted, by means of the applied voltage, over a continuous range. In many cases, the device exhibits near 100% efficiency with no voltage applied and essentially zero efficiency with a sufficiently high voltage applied. In certain types of HPDLC devices, magnetic fields can be used to control the LC orientation. In some HPDLC applications, phase separation of the LC material from the polymer can be accomplished to such a degree that no discernible droplet structure results. An SBG can also be used as a passive grating. In this mode, its chief benefit is a uniquely high refractive index modulation. SBGs can be used to provide transmission or reflection gratings for free space applications. SBGs can be implemented as waveguide devices in which the HPDLC forms either the waveguide core or an evanescently coupled layer in proximity to the waveguide. The glass plates used to form the HPDLC cell provide a total internal reflection light guiding structure. Light can be coupled out of the SBG when the switchable grating diffracts the light at an angle beyond the TIR condition.

HPDLC Material Systems

HPDLC mixtures in accordance with various embodiments of the invention generally include LC, monomers, photoinitiator dyes, and coinitiators. The mixture (often referred to as syrup) frequently also includes a surfactant. For the purposes of describing the invention, a surfactant is defined as any chemical agent that lowers the surface tension of the total liquid mixture. The use of surfactants in PDLC mixtures is known and dates back to the earliest investigations of PDLCs. For example, a paper by R. L Sutherland et al., SPIE Vol. 2689, 158-169, 1996, the disclosure of which is incorporated herein by reference, describes a PDLC mixture including a monomer, photoinitiator, coinitiator, chain extender, and LCs to which a surfactant can be added. Surfactants are also mentioned in a paper by Natarajan et al, Journal of Nonlinear Optical Physics and Materials, Vol. 5 No. I 89-98, 1996, the disclosure of which is incorporated herein by reference. Furthermore, U.S. Pat. No. 7,018,563 by Sutherland; et al., discusses polymer-dispersed liquid crystal material for forming a polymer-dispersed liquid crystal optical element comprising: at least one acrylic acid monomer; at least one type of liquid crystal material; a photoinitiator dye; a coinitiator; and a surfactant. The disclosure of U.S. Pat. No. 7,018,563 is hereby incorporated by reference in its entirety.

The patent and scientific literature contains many examples of material systems and processes that can be used to fabricate SBGs, including investigations into formulating such material systems for achieving high diffraction efficiency, fast response time, low drive voltage, and so forth. U.S. Pat. No. 5,942,157 by Sutherland and U.S. Pat. No. 5,751,452 by Tanaka et al. both describe monomer and liquid crystal material combinations suitable for fabricating SBG devices. Examples of recipes can also be found in papers dating back to the early 1990s. Many of these materials use acrylate monomers, including:

R. L. Sutherland et al., Chem. Mater. 5, 1533 (1993), the disclosure of which is incorporated herein by reference, describes the use of acrylate polymers and surfactants. Specifically, the recipe comprises a crosslinking multifunctional acrylate monomer; a chain extender N-vinyl pyrrolidinone, LC E7, photoinitiator rose Bengal, and coinitiator N-phenyl glycine. Surfactant octanoic acid was added in certain variants.

Fontecchio et al., SID 00 Digest 774-776, 2000, the disclosure of which is incorporated herein by reference, describes a UV curable HPDLC for reflective display applications including a multi-functional acrylate monomer, LC, a photoinitiator, a coinitiators, and a chain terminator.

Y. H. Cho, et al., Polymer International, 48, 1085-1090, 1999, the disclosure of which is incorporated herein by reference, discloses HPDLC recipes including acrylates.

Karasawa et al., Japanese Journal of Applied Physics, Vol. 36, 6388-6392, 1997, the disclosure of which is incorporated herein by reference, describes acrylates of various functional orders.

T. J. Bunning et al., Polymer Science: Part B: Polymer Physics, Vol. 35, 2825-2833, 1997, the disclosure of which is incorporated herein by reference, also describes multifunctional acrylate monomers.

G. S. Iannacchione et al., Europhysics Letters Vol. 36 (6). 425-430, 1996, the disclosure of which is incorporated herein by reference, describes a PDLC mixture including a penta-acrylate monomer, LC, chain extender, coinitiators, and photoinitiator.

Acrylates offer the benefits of fast kinetics, good mixing with other materials, and compatibility with film forming processes. Since acrylates are cross-linked, they tend to be mechanically robust and flexible. For example, urethane acrylates of functionality 2 (di) and 3 (tri) have been used extensively for HPDLC technology. Higher functionality materials such as penta and hex functional stems have also been used.

Systems for Multiplying Display Resolution

Systems integrating display resolution-multiplication solutions in accordance with various embodiments of the invention can be implemented in many different ways. In many embodiments, the system includes an image projector for projecting image light from a microdisplay, an image processor for computing a native image and at least one image shifted in a predefined direction for sequential display by the image projector, and at least one switchable grating capable of being switched between diffracting and non-diffracting states. In some embodiments, the switchable gratings are configured in free space. In several embodiments, the switchable gratings are disposed within at least one waveguide. Depending on the specific application, the system can include a combination of switchable and passive gratings. In a number of embodiments, the switchable grating can be optically coupled to the image projector. Light can be projected such that light from each pixel is mapped into a unique angular direction. In several embodiments, the switchable gratings have a first configuration for propagating the native image light and at least one other configuration for propagating shifted image light having an angular displacement corresponding to the image shift in a predefined direction. The native and shifted images can be displayed sequentially within a human eye integration period to provide display-resolution multiplication. In a number of embodiments, the display resolution can be doubled. In some embodiments, the display resolution is quadrupled. As can readily be appreciated, the specific characterizations of such systems can depend on the specific implementations, the design of which can depend on the specific requirements of a given application.

The image shift can be implemented in several different ways. In many embodiments, the image processor computes at least one image shift. In further applications, the image processor computes at least two image shifts for a given native image. In several embodiments, the image is shifted in a predetermined amount in a predetermined direction(s). In further embodiments, the image shift is equal to exactly half a pixel vertical or horizontal dimension. In some embodiments, the image shift is N+½ times a pixel dimension, where N is an integer (where 0 is assumed to be an integer). This may give more flexibility in the offset design, losing only N pixels in image size. In several embodiments, the native and shifted images are sequentially displayed within a human eye integration period. In some embodiments, the image shift is one of vertical or horizontal to provide resolution doubling. In a number of embodiments, the image shifts include vertical and horizontal shifts to provide doubling of both vertical and horizontal resolutions. In a variety of embodiments, integer vertical and half pixel horizontal offsets are provided. In other embodiments, integer horizontal and half pixel vertical offsets are provided. In some embodiments, vertical and horizontal offsets can have different integer multiples of the pixel dimension to compensate for image offsets arising from non-orthogonal input, fold, and output grating vector (K-vector components) in the plane of a waveguide. As can readily be appreciated, the specific image shift scheme can be chosen depending on the specific requirements of a given application.

Figure 1B:
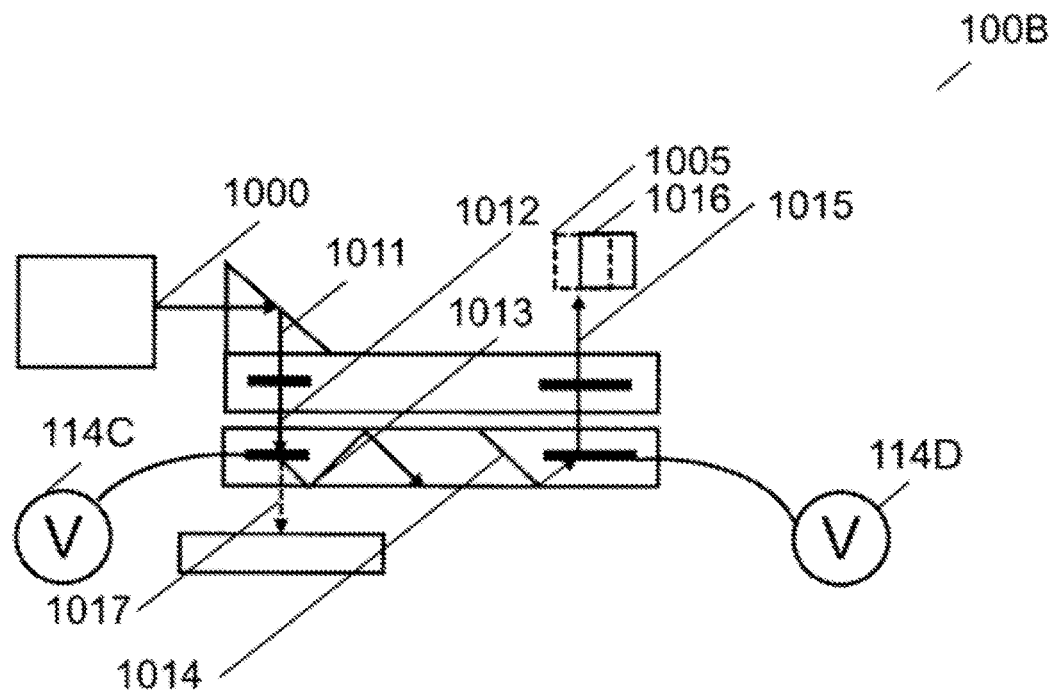

FIGS. 1A and 1B conceptually illustrate cross sectional views of a resolution-multiplication waveguide device in two different operational states in accordance with an embodiment of the invention. As shown in the schematic side elevation views of FIGS. 1A and 1B, the device can have at least two different configurations 100A, 100B for propagating a native image and at least one shifted image. Utilizing such configurations, the device is capable of doubling the display resolution. In many embodiments, further resolution-multiplication operations, such as but not limited to resolution-quadrupling, can be enabled. In some embodiments, such operations are enabled by stacking further waveguides for deflecting light into different directions corresponding to pixel shifts in different directions. In the illustrative embodiment, the device includes an image projector 101, an image processor 102, and a resolution-multiplication waveguide.

Referring to FIG. 1A, the image projector/generator 101 can include a microdisplay panel 101A providing an array of pixels 101B and a projection lens 101C for projecting image light from the microdisplay such that light from each pixel is mapped into a unique angular direction. In some embodiments, the projection lens is a multi-element refractive lens system. In several embodiments, the projection lens can include diffractive elements or surfaces. Although FIG. 1A illustrates an image projector of this basic configuration, it should be apparent to those skilled in the art that any type of image projector can be implemented. For example, in a number of embodiments, the image projector uses a laser scanner to form a pixelated image. In many embodiments, the image projector includes more than one microdisplay or laser scanner for providing more than one pixelated image source.

The image processor 102, which can be electrically connected to the image projector 101 via a data communications and control link 102A, is capable of computing a native (unshifted) image and at least one image shifted in a predefined direction for sequential display by the image projector 101. Image light from the image projector 101 can be optically coupled into the resolution-multiplication waveguide. In the illustrative embodiment, the image light is coupled into the resolution-multiplication waveguide by a prism 109. In other embodiments, the prism may be replaced by a grating.

The resolution-multiplication waveguide can include an upper waveguide layer 103 containing an upper input grating 104 and an upper output grating 105 and a lower waveguide layer 106 containing a lower input grating 107 and a lower output grating 108. In many embodiments, the gratings are switchable gratings capable of switching states in response to an applied voltage. As shown, voltages can be applied to the gratings by electrical connections indicated by the symbol V and referenced by the numerals 114A-114D. In the illustrative embodiment, the upper input grating 104 substantially overlaps the lower input grating 107 and the upper output grating 105 substantially overlaps the lower output grating 108. The first configuration, which is illustrated in FIG. 1A, shows when the upper input and output gratings 104, 105 are in their diffracting states. The second configuration, which is illustrated in FIG. 1B, shows when the upper input and output gratings 104, 105 are in their non-diffracting states.

When a native image frame is displayed on the microdisplay 101A, the light can travel from the image projector 101 and into the upper waveguide layer 103. With the upper set of input and output gratings 104, 105 in their diffracting states, light can be extracted out of the waveguide layer 103. This light path is illustrated in FIG. 1A by rays 1000-1004 with a native image frame pixel indicated by 1005. When a shifted image frame is displayed, the light can travel from the image projector 101 and into the lower waveguide layer 106. With the upper set of input and output gratings 104, 105 in their non-diffracting states and the lower set of input and output gratings 107, 108 in their diffracting states, the light can be extracted out. The light path for the shifted image is illustrated in FIG. 1B by rays 1000, 1011-1015 with a shifted image frame pixel indicated by 1016. Rays 1009, 1017 indicate the zero-order light from the input gratings 104, 107 of the waveguide layers 103, 106. As shown, the zero-order light propagates substantially undeviated out of the waveguides onto a light trap 113. It should be apparent from the drawings that with minor modifications to the architecture shown in FIGS. 1A and 1B, either of the waveguide layers can be used to propagate the native image frame.

Figure 2:
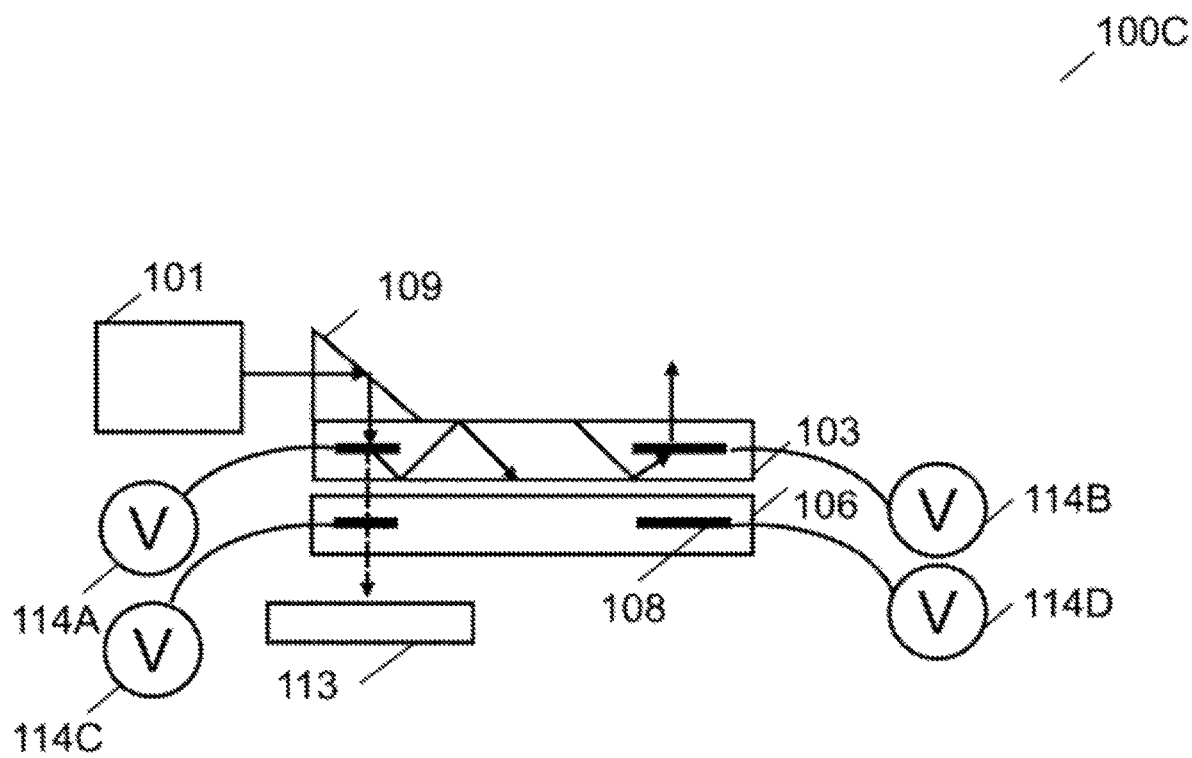
FIG. 2 conceptually illustrates a schematic cross-sectional view of a resolution-multiplication waveguide device in accordance with an embodiment of the invention.

In many embodiments, the gratings 104, 105 of the upper waveguide layer 103 are configured to switch while the gratings 107, 108 of the lower waveguide layer 106 are configured to always be in their diffracting states. In some embodiments, the gratings of both waveguide layers are configured to switch. In further embodiments, the gratings of the lower waveguide layer are switched into their non-diffracting states when the gratings of the upper waveguide are switched into their diffracting states. Such a configuration is conceptually illustrated in FIG. 2. As shown, the configuration 100C can be implemented by controlling voltage sources 114A-114D to switch the gratings as described above. In such configurations, the risk of zero order light coupling back into the upper waveguide layer can be reduced.

The gratings can be switched in coordination with the frame update of the microdisplay such that when the gratings of the upper waveguide layer are in their diffracting states, the input image generator displays the native image and when the gratings of the upper waveguide layer are in their non-diffracting states, the image generator displays an image recomputed with a half pixel horizontal shift. In many embodiments, the switching of the native and shifted frames takes place within the human eye integration time, and the display viewer preserves a doubling of the displayed image resolution.

The gratings in the upper and lower waveguides can be similarly configured but have slightly different grating prescriptions designed to produce a relative angular shift, equivalent to half a pixel, to the native image. Such effects can be achieved in many different ways. In some embodiments, the required angular shift is produced by applying small tilts to the grating K-vectors. In several embodiments, the required angular shift is produced by small changes to the surface gratings formed by the input and output gratings. Since the angular separation of the native and shifted image frames is typically very small, when coupled into a display waveguide, the image frames image light is propagated with high efficiency before being extracted into the eye box of the waveguide display. In a number of embodiments, the upper and lower waveguides are designed such that only a few total internal reflection bounces take place before light extraction. This can reduce the beam expansion for efficient coupling into a separate waveguide device.

In many embodiments, the waveguide layers can be separated by a small air gap to ensure optical isolation. In a number of embodiments, a low index material such as a nanoporous material can be used for waveguide isolation. Waveguide layers can be configured for specific spectral bands. In some embodiments, separate waveguide layers are provided for red green and blue light. In several embodiments, separate waveguide layers are provided for red and blue/green light. The waveguide gratings can also be configured to multiplex more than one wavelength. In some embodiments, the waveguide gratings multiplex more than one angular bandwidth.

Figure 3A:
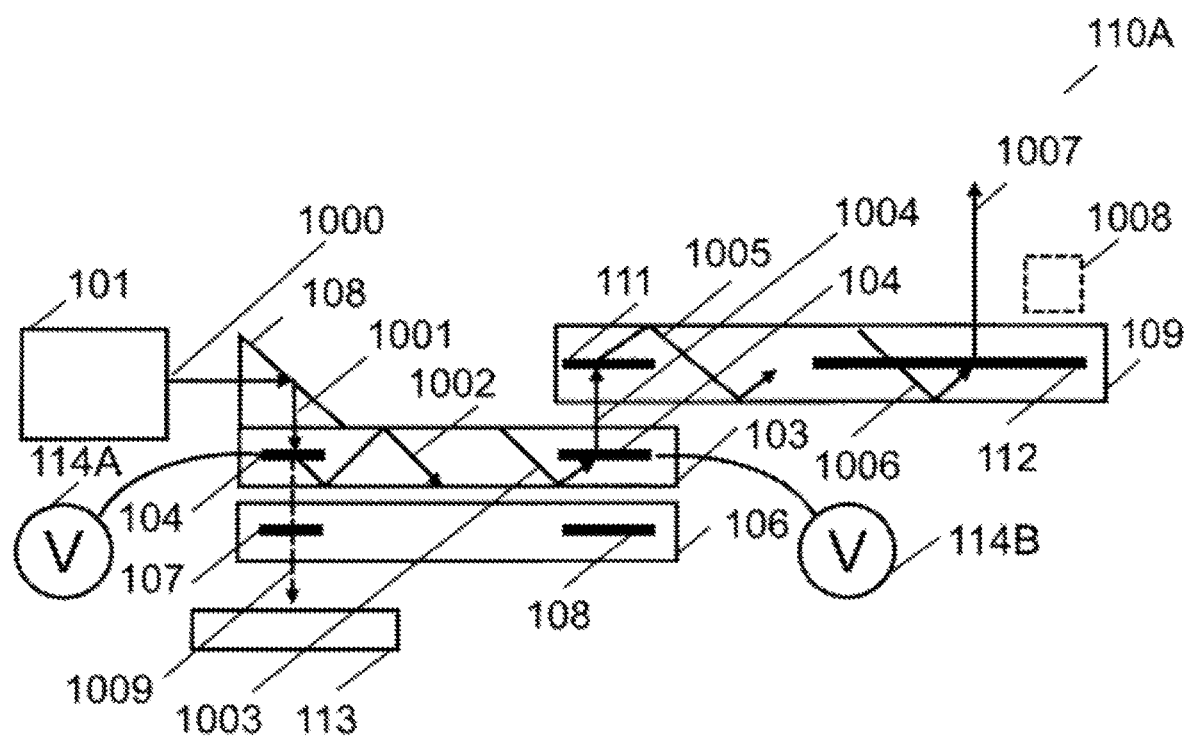
FIG. 3A conceptually illustrates a schematic cross-sectional view of a first operational state of a resolution-multiplication waveguide device optically interfaced to a waveguide display in accordance with an embodiment of the invention.
Figure 3B:
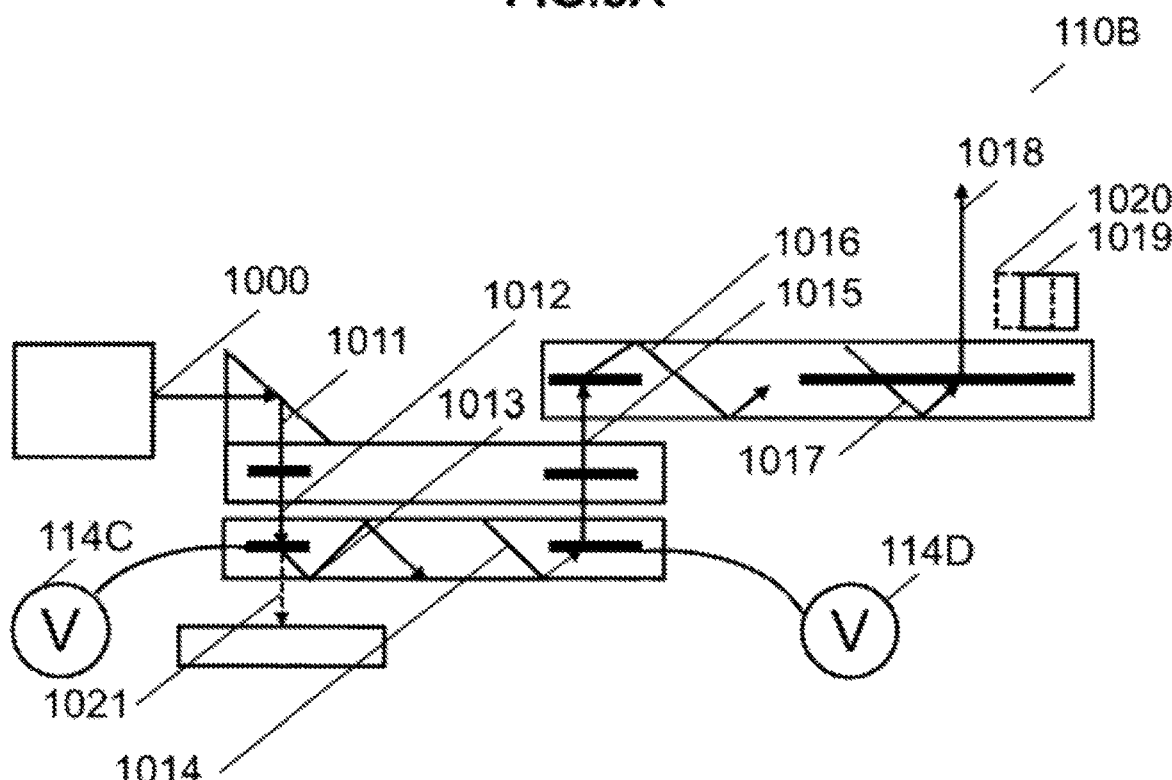
FIG. 3B conceptually illustrates a schematic cross-sectional view of a second operational state of a resolution-multiplication waveguide device optically interfaced to a waveguide display in accordance with an embodiment of the invention.

In many embodiments, a resolution-multiplication waveguide can be optically coupled to a waveguide display. FIGS. 3A and 3B conceptually illustrate schematic side elevation views showing two operational states 110A, 110B of one such embodiment. The resolution-multiplication waveguide can be implemented identically to those illustrated in FIGS. 1A, 1B, and 2. Referring to FIG. 3A, the waveguide display 109 includes an input grating 111 and an output grating 112. In some embodiments, the waveguide display further includes a fold grating. In several embodiments, the waveguide display includes separate layers for propagating light of different colors. In the illustrative embodiment and similar to systems discussed previously, native image frame light 1004 emerging from the upper waveguide layer of the resolution-doubling waveguide can be coupled into the waveguide display along a TIR path represented by rays 1005-1006 before being coupled out of the waveguide as represented by ray 1007 to form an output image containing pixels such as the one indicated by 1008. As shown in FIG. 3B, shifted image frame light 1015 emerging from the second waveguide layer of the resolution-doubling waveguide can be coupled into the waveguide display along a TIR path represented by rays 1016-1017 before being coupled out of the waveguide as represented by ray 1018 to form an output image containing pixels such as the one indicated by 1008, which is shifted from the corresponding native pixel. In the illustrative embodiment, the output image is shifted by half a pixel width.

Figure 4A:
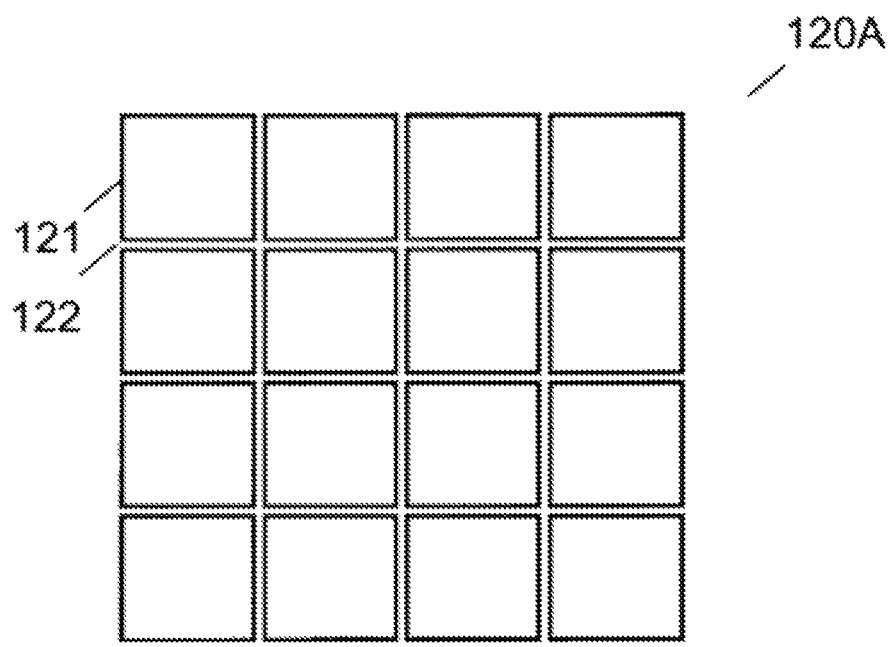
FIGS. 4A-4D conceptually illustrate front elevation views of four pixel-shifting steps used to provide resolution-quadrupling in some embodiments in accordance with an embodiment of the invention FIGS. 5A-5D conceptually illustrate schematic cross-sectional views of four operational state of a resolution-quadrupling waveguide device in accordance with an embodiment of the invention.
Figure 4B:
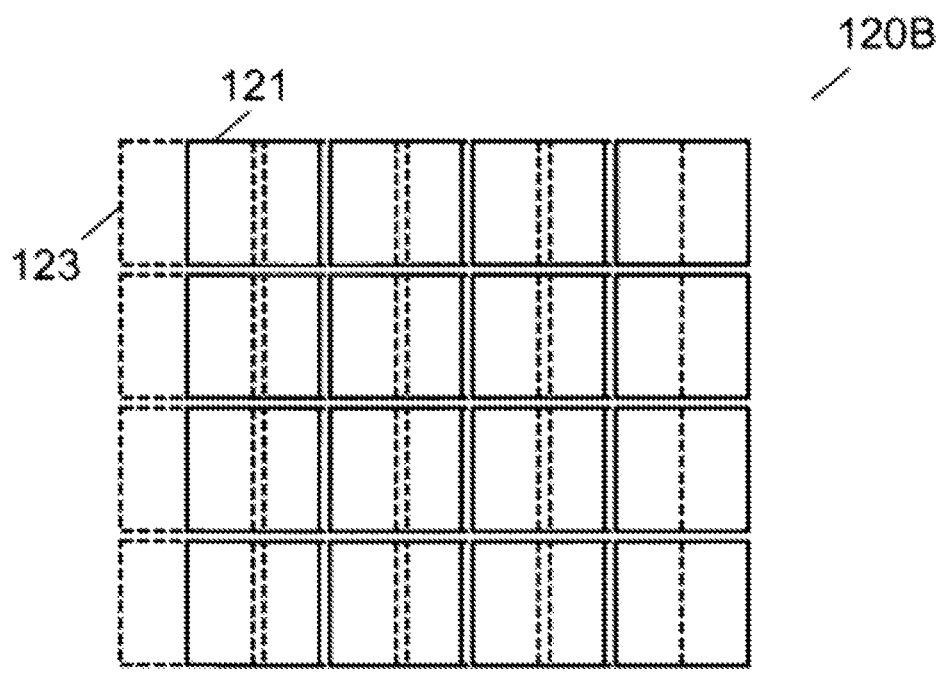
Figure 4C:
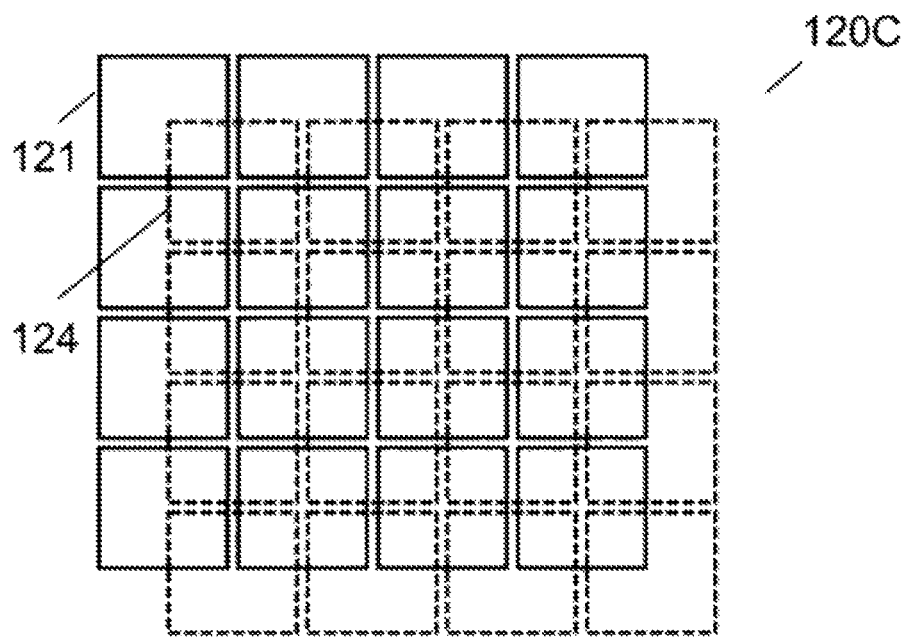
Figure 4D:
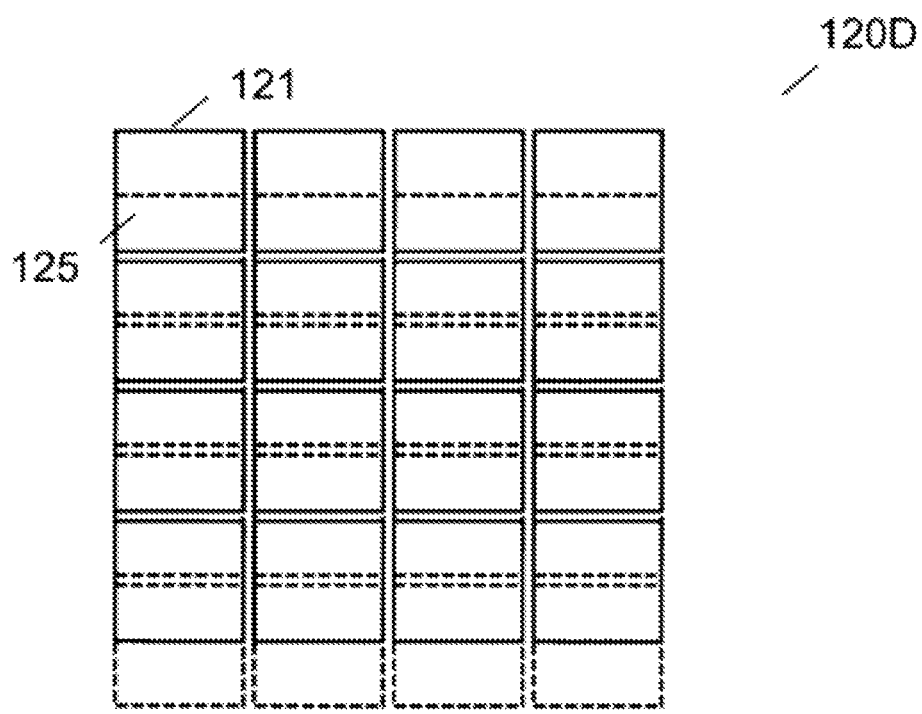

In many embodiments, further resolution-multiplication operations, such as but not limited to resolution quadrupling, can be enabled. For example, resolution quadrupling can be implemented by doubling both the vertical and horizontal resolutions. FIGS. 4A-4D conceptually illustrate front elevation views of four different pixel-shifting steps used to provide resolution quadrupling in accordance with an embodiment of the invention. FIG. 4A shows a native image 120A, which is represented by a 4×4 pixel array containing pixels 121 separated by gaps 122. FIG. 4B illustrates a horizontally-shifted pixel array 120B in which each pixel 121 has undergone a first half pixel horizontal shift relative to its corresponding native pixel, resulting in pixels 123. FIG. 4D illustrates a shifted pixel array 120D in which each pixel 124 is horizontally and vertically shifted relative to its corresponding native pixel 121. FIG. 4D illustrates a vertically-shifted pixel array 120D in which each pixel 125 has undergone a half pixel vertical shift relative to its corresponding native pixel 121.

Figure 5A:
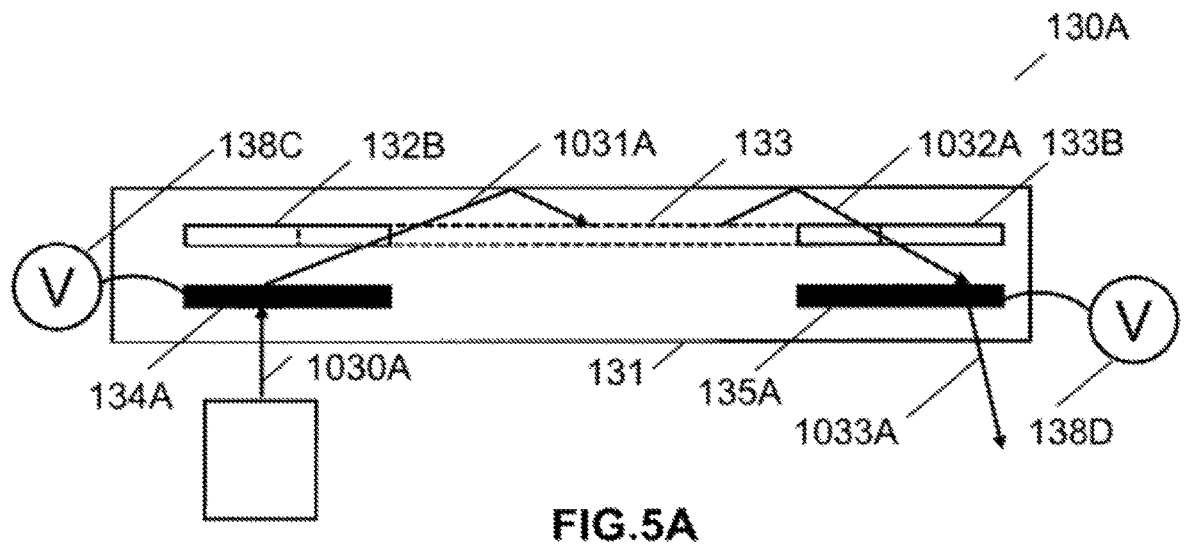
Figure 5B:
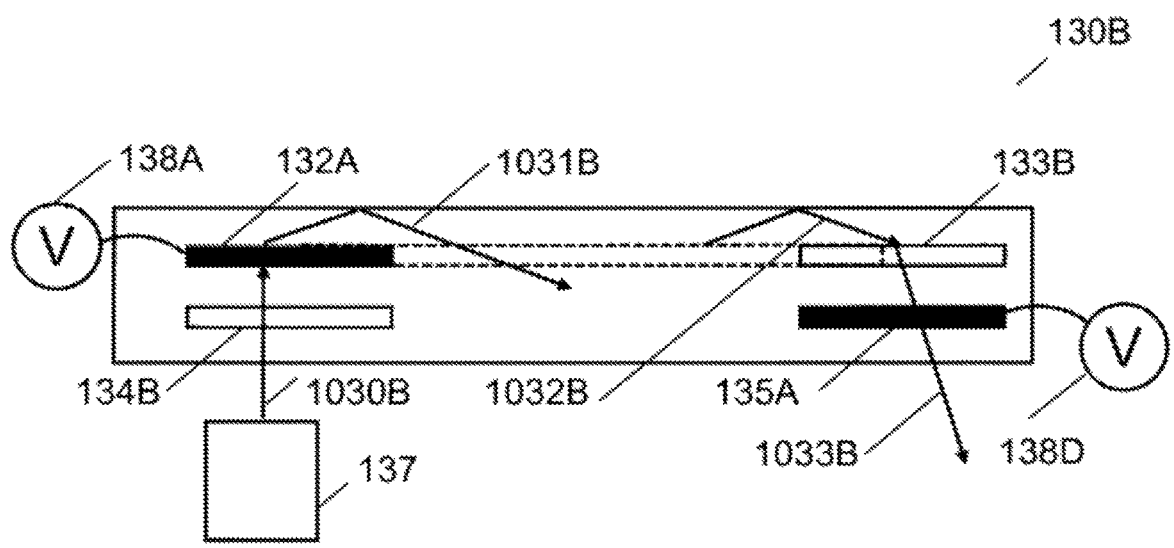

In some embodiments, such as the one shown in the schematic side elevation views of FIGS. 5A-5B, the at least one switchable grating includes first, second, third, fourth gratings disposed in a waveguide. The first grating overlaps the third grating and the second grating overlaps the fourth grating. The first and third gratings act as input couplers and the second and further grating act as output couplers. The first configuration is provided by one of first or third gratings and one of second or fourth gratings in their diffracting states. The configurations for propagating shifted image light are provided by other combinations of one of the first or third gratings and one of the second or fourth gratings. In some embodiments, first and second gratings are disposed in a first layer within a waveguide and the third and fourth gratings are disposed in a second layer within the waveguide.

FIGS. 5A-5D conceptually illustrate the grating states of a waveguide display designed to propagate the four-pixel arrays configurations illustrated in FIGS. 4A-4D in accordance with an embodiment of the invention. In the illustrative embodiment, the waveguide display 131 includes an upper grating layer containing an upper input grating and an upper output grating, represented by diffracting states 132A, 133A and non-diffracting states 132B, 133B, where 132A and 132B describe the state of the upper input grating and 133A and 133B describe the state of the upper output grating. The waveguide display can also include a lower grating layer containing a lower input grating and a lower output grating, represented by diffracting states 134A, 135A and non-diffracting states 134B, 135B, where 134A and 134B describe the state of the lower input grating and 135A and 135B describe the state of the lower output grating. The input gratings can be configured for coupling light from the image projector 137 into a TIR path in the waveguide display 131 and the output gratings can be configured for coupling light out of the waveguide display 131. In the illustrative embodiment, the waveguide display 131 further includes a common fold grating 133 disposed in the upper grating layer to provide two-dimensional beam expansion in association with the output gratings. The fold grating can be disposed in either of the two grating layers. In some embodiments, each grating layer contains a fold grating. In other embodiments, the waveguide display does not contain or require a fold grating. Voltages are applied to the gratings via electrical connections to a voltage source indicated by the symbol V and referenced by the numerals 138A-138D.

Figure 5C:
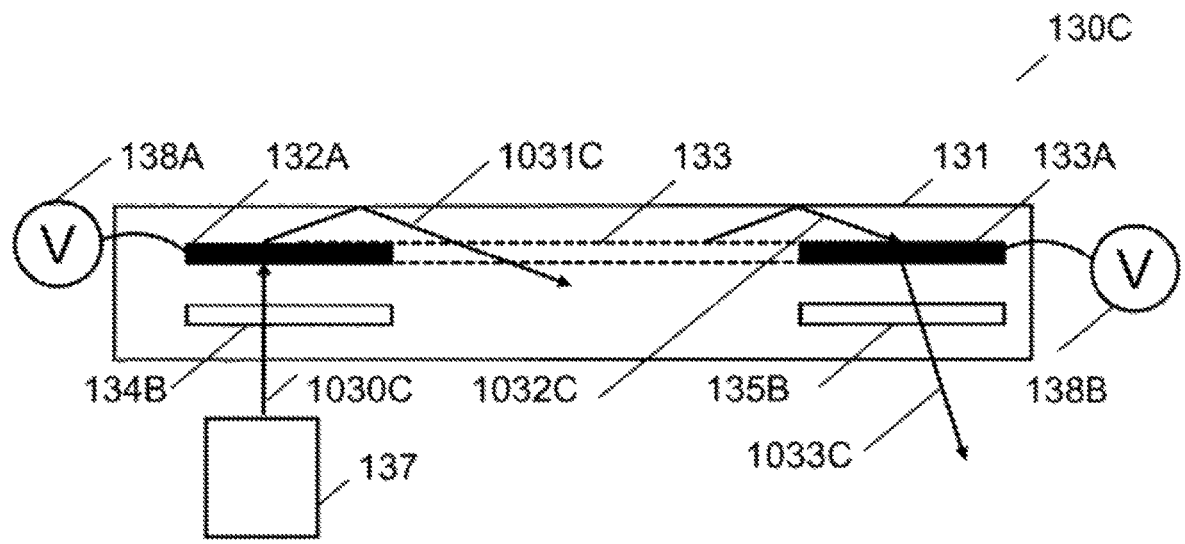
Figure 5D:
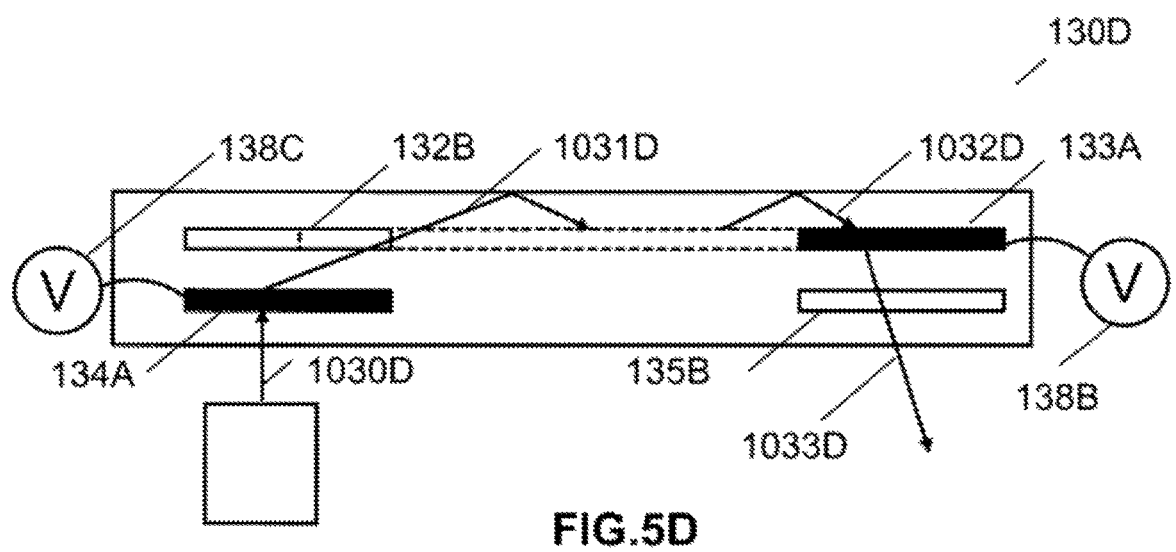

FIG. 5A conceptually illustrates the grating configuration 130A for propagating the pixel configuration of FIG. 4A (native image) in which the lower input grating and the lower output grating are in their diffracting states 134A, 135A respectively and the upper input grating and the upper input grating are in their non-diffracting states 132B, 133B respectively. The diffracted ray path is indicated by rays 1030A-1033A. FIG. 5B conceptually illustrates the grating configuration 130B for propagating the pixel configuration of FIG. 4B in which the upper input grating and the lower output grating are in their diffracting states 132A, 135A respectively and the lower input grating and the upper output grating are in their non-diffracting states 134B, 133B respectively. The diffracted ray path is indicated by rays 1030B-1033B. FIG. 5C conceptually illustrates the grating configuration 130C for propagating the pixel configuration of FIG. 4C in which the upper input grating and the upper output grating are in their diffracting states 132A, 133A respectively and the lower input grating and the upper output grating are in their non-diffracting states 134B,135B respectively. The diffracted ray path is indicated by rays 1030C-1033C. FIG. 5D illustrates the grating configuration 130D for propagating the pixel configuration of FIG. 4D in which the lower input grating and the upper output grating are in their diffracting states 134A,133A respectively and the upper input grating and the lower output grating are in their non-diffracting states 132B,135B respectively. The diffracted ray path is indicated by rays 1030A-1033A.

Achieving a 60 Hz 1080p image frame rate using the apparatus of FIGS. 5A-5D can require four video sub-frames to be generated at 240 Hz video frame rate. Each video sub-frame can further require red, green, blue sub-frames, increasing the frame rate to 720 Hz. In many embodiments, the two-layer grating architecture illustrated in FIGS. 5A-5D can be used to propagate monochromatic light with further similar waveguides being required for other colors. For example, in some embodiments, separate waveguides can be implemented for red, green, and blue. In several embodiments, color display is provided with one red waveguide and one blue/green waveguide. The switchable grating arrangement of FIGS. 5A-5D has several advantages including but not limited to: low cost and complexity; the input image from the projector passing through the minimum number of ITO layers; and the dual switchable grating offsets being switched separately thereby minimizing loss.

It should be apparent from consideration of FIGS. 5A-5D that, in some embodiments, one of the upper or lower input gratings can be eliminated to provide a waveguide that propagates the native image and a shifted image sequentially. Alternatively, by the same reasoning, one of the upper or lower output gratings can be eliminated to achieve the same effect. In some embodiments, one of the grating layers in FIGS. 5A-5D may be non-switching.

Figure 6:
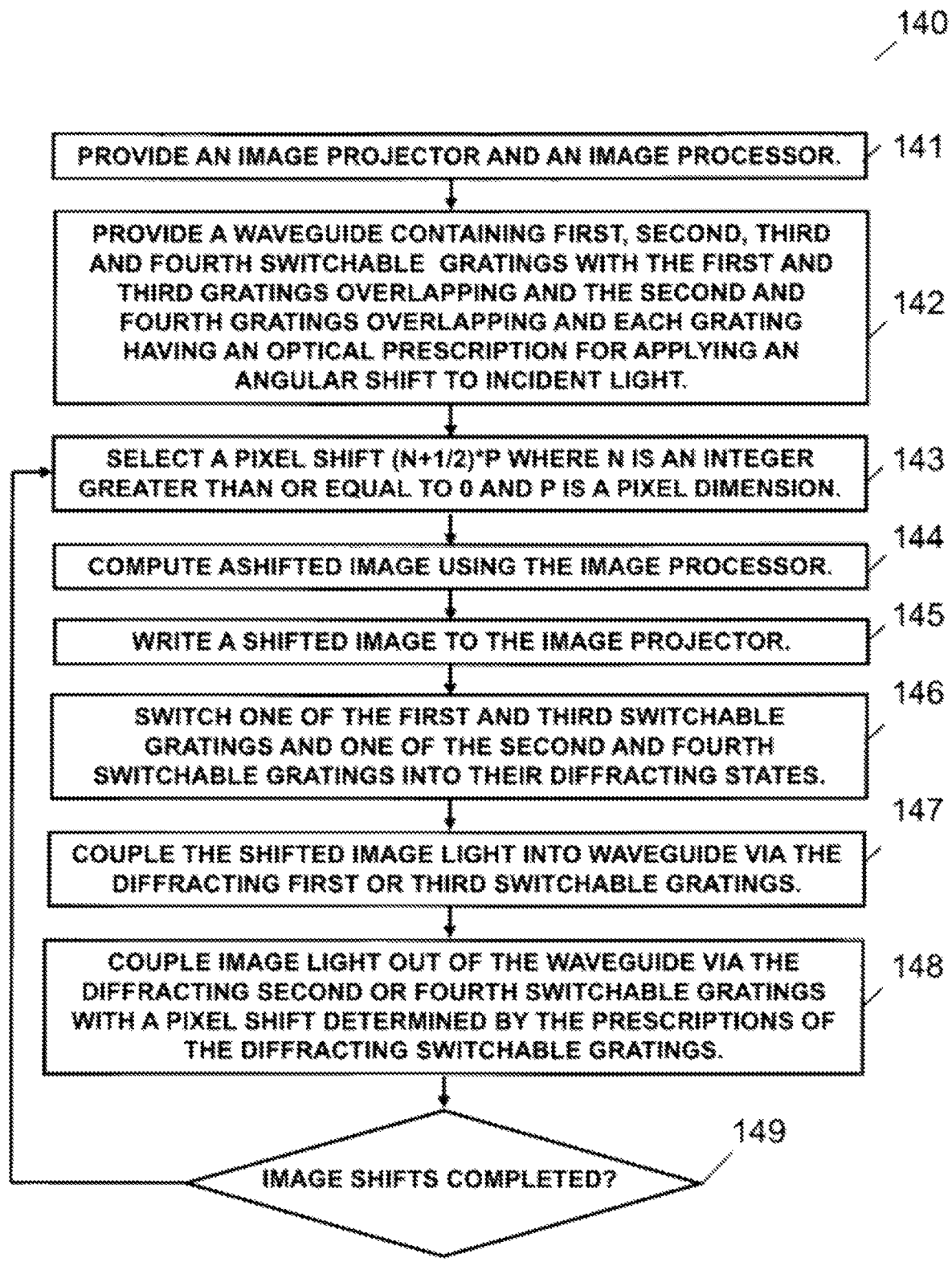
FIG. 6 conceptually illustrates a flow chart illustrating a method of multiplying the resolution of a waveguide display in accordance with an embodiment of the invention.

FIG. 6 shows a flow chart conceptually illustrating a method of multiplying the resolution of a waveguide display in accordance with an embodiment of the invention. As shown, the process 140 includes providing (141) an image projector and an image processor. A waveguide can be provided (142) in which the waveguide contains first, second, third and fourth switchable gratings with the first and third gratings substantially overlapping and the second and fourth gratings substantially overlapping. Each grating can have an optical prescription for applying an angular shift to incident light. A pixel shift can be selected (143). In many embodiments, the pixel shift satisfies (N+½)*P, where N is an integer greater than or equal to zero and P is a pixel dimension. A shifted image can then be computed (144) using the image processor. A shifted image can be written (145) to the image projector. For display, one of the first and third switchable gratings and one of the second and fourth switchable gratings can be switched (146) into their diffracting states. The shifted image light can be coupled (147) into the waveguide via the diffracting first or third switchable gratings and can be coupled (148) out of the waveguide via the diffracting second or fourth switchable gratings with a pixel shift determined by the prescriptions of the diffracting switchable gratings. The process 140 can repeat starting at step 143 until all required image pixel shifts have been completed. Although FIG. 6 illustrates a specific process for implementing resolution-multiplication of a waveguide display, any of a variety of processes and modifications of such can be practiced in accordance with various embodiments of the invention.

In many embodiments, the switchable gratings are disposed in a waveguide that further includes a non-switching grating. In further embodiments the non-switching grating is a fold grating (sometimes referred to as a turning grating) used for beam expansion as described above. In such embodiments, the waveguide can implement resolution-multiplication and two-axis beam expansion. In several embodiments, at least one of the gratings used for resolution-multiplication is a rolled k-vector grating. The K-vector (more commonly referred to as the grating vector) can be referred to as a vector-aligned normal to the grating planes (or fringes), which determines the optical efficiency for a given range of input and diffracted angles. Rolling the K-vectors allows the angular bandwidth of the grating to be expanded without the need to increase the waveguide thickness. In some embodiments, the switchable gratings include at least one grating multiplexing at least one of wavelength or angular bandwidth. It is well established in the literature of holography that more than one holographic prescription can be recorded into a single holographic layer. As such, methods for recording such multiplexed holograms are well known to those skilled in the art. In some embodiments, at least one of the switching gratings and other gratings used in association can combine two or more angular diffraction prescriptions to expand the angular bandwidth or to expand the spectral bandwidth. For example, color multiplexed gratings can be used to diffract two or more of the primary colors.

In any of the above described embodiments, the image projector, which can be referred to as an input image node ("IIN"), can integrate a microdisplay panel, a light source, and other optical components commonly used to illuminate the display panel, to separate the reflected light, and to collimate it into the required field of view. In many embodiments, the image projector can be based on the embodiments and teachings disclosed in U.S. patent application Ser. No. 13/869,866 entitled HOLOGRAPHIC WIDE-ANGLE DISPLAY, and U.S. patent application Ser. No. 13/844,456 entitled TRANSPARENT WAVEGUIDE DISPLAY, the disclosures of which are hereby incorporated by reference in their entireties for all purposes. In some embodiments, the image projector contains a beamsplitter for directing light onto the microdisplay and transmitting the reflected light towards the waveguide. In several embodiments, the beamsplitter is a grating recorded in HPDLC and uses the intrinsic polarization selectivity of such gratings to separate the light illuminating the display and the image modulated light reflected off the display. In a number of embodiments, the beam splitter is a polarizing beam splitter cube. In a variety of embodiments, the image projector incorporates an illumination homogenizer or a laser beam despeckler. The despeckler can be implemented based on the embodiments and teachings of U.S. Pat. No. 8,565,560 entitled LASER ILLUMINATION DEVICE, the disclosure of which is herein incorporated by reference in its entirety for all purposes.

In many embodiments, the light source is a laser. In some embodiments, the light source is an LED, which can provide better illumination and color uniformity than laser. In a number of embodiments, the image projector includes one or more lenses for modifying the illumination angular characteristics. If laser illumination is used, there can exist a risk of illumination banding occurring at the waveguide output. In several embodiments, laser illumination banding in waveguides can be overcome using the techniques and teachings disclosed in U.S. patent application Ser. No. 15/512,500 entitled METHOD AND APPARATUS FOR GENERATING INPUT IMAGES FOR HOLOGRAPHIC WAVEGUIDE DISPLAYS, the disclosure of which is herein incorporated by reference in its entirety for all purposes. In some embodiments, the light from the light source is polarized. In a number of embodiments, the image source is a liquid crystal display ("LCD") micro display or liquid crystal on silicon ("LCoS") micro display. In a variety of embodiments, the image source is a micro-electro-mechanical system ("MEMs") device. In some embodiments, the image source is a display panel based on Texas Instruments' Digital Light Projector ("DLP") technology.

In many embodiments, any of the gratings used can encode optical power for adjusting the collimation of the output. In some embodiments, the output image is at infinity. In several embodiments, the output image can be formed at distances of several meters from the waveguide. In embodiments utilizing fold gratings, the fold grating angular bandwidth can be enhanced by designing the grating prescription to provide dual interaction of the guided light with the grating. Exemplary embodiments of dual interaction fold gratings are disclosed in U.S. patent application Ser. No. 14/620,969 entitled WAVEGUIDE GRATING DEVICE, the disclosure of which is herein incorporated by reference in its entirety for all purposes.

The waveguides used for resolution-multiplication in accordance with various embodiments of the invention can be formed by sandwiching the grating layers between glass or plastic substrates to form a stack within which total internal reflection occurs at the outer substrate and air interfaces. The stack can further include additional layers such as beam splitting coatings and environmental protection layers. In some embodiments, the cell substrates can be fabricated from glass. One type of glass substrate utilized is the standard Coming Willow glass substrate (index 1.51), which is available in thicknesses down to 50 micrometers. In other embodiments, the cell substrates can be optical plastics. The gratings can be recorded in layers of material coated onto a transparent substrate and covered by a protective transparent layer after the holographic exposure process has been completed. In several embodiments, the grating layer can be broken up into separate layers. For example, in a number of embodiments, a first layer includes the fold grating while a second layer includes the output grating. In further embodiments, a third layer can include the input coupler or grating. The number of layers can then be laminated together into a single waveguide substrate. In some embodiments, the grating layer includes a number of pieces including the input coupler, the fold grating and the output grating (or portions thereof) that are laminated together to form a single substrate waveguide. The pieces can be separated by optical glue or other transparent material of refractive index matching that of the pieces.

The grating layer can be formed via a cell making process by creating cells of the desired grating thickness and vacuum filling each cell with holographic recording material for each of the input coupler, the fold grating, and the output grating. In many embodiments, the cell is formed by positioning multiple plates of glass with gaps between the plates of glass that define the desired grating thickness for the input coupler, the fold grating, and the output grating. In some embodiments, one cell can be made with multiple apertures such that the separate apertures are filled with different pockets of holographic recording material. Any intervening spaces can then be separated by a separating material such as glue or oil to define separate areas. In several embodiments, the holographic material can be spin-coated onto a substrate and then covered by a second substrate after curing of the material. By using a fold grating, the waveguide display can utilize fewer layers than previous systems and methods of displaying information. In addition, by using a fold grating, light can travel by total internal refection within the waveguide in a single rectangular prism defined by the waveguide outer surfaces while achieving dual pupil expansion. The input coupler, the fold grating, and the output grating can be created by interfering two waves of light at an angle within the substrate to create a holographic wave front, thereby creating light and dark fringes that are set in the waveguide substrate at a desired angle. In some embodiments, the grating in a given layer is recorded in stepwise fashion by scanning or stepping the recording laser beams across the grating area. In a number of embodiments, the gratings are recorded using mastering and contact copying process currently used in the holographic printing industry.

In many embodiments, the gratings are recorded in a holographic polymer dispersed liquid crystal ("HPDLC") (e.g., a matrix of liquid crystal droplets), although SBGs may also be recorded in other materials. In one embodiment, SBGs are recorded in a uniform modulation material, such as POLICRYPS or POLIPHEM having a matrix of solid liquid crystals dispersed in a liquid polymer. The SBGs can be switching or non-switching in nature. In its non-switching form, an SBG has the advantage over conventional holographic photopolymer materials of being capable of providing high refractive index modulation due to its liquid crystal component. Exemplary uniform modulation liquid crystal-polymer material systems are disclosed in U.S. Patent Publication No.: 2007/0019152 by Caputo et al. and PCT Application No.: PCT/EP2005/006950 by Stumpe et al., both of which are incorporated herein by reference in their entireties. Uniform modulation gratings are characterized by high refractive index modulation (and hence high diffraction efficiency) and low scatter.

In many embodiments, at least one of the gratings is recorded in a reverse mode HPDLC material. Reverse mode HPDLC differs from conventional HPDLC in that the grating is passive when no electric field is applied and becomes diffractive in the presence of an electric field. The reverse mode HPDLC can be based on any of the recipes and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES, the disclosure of which is herein incorporated by reference in its entirety for all purposes. The grating can be recorded in any of the above material systems but used in a passive (non-switching) mode. In such embodiments, the fabrication process can be identical to that used for switched but with the electrode coating stage being omitted. LC polymer material systems are highly desirable in view of their high index modulation. In some embodiments, the gratings are recorded in HPDLC but are not switched.

The resolution-multiplication apparatuses in accordance with various embodiments of the invention can be used in combination with an eye tracker to form an eye tracker display. The eye tracker can be based on the embodiments and teachings of PCT Application No.: PCT/GB2014/000197 entitled HOLOGRAPHIC WAVEGUIDE EYE TRACKER, PCT/GB2015/000274 entitled HOLOGRAPHIC WAVEGUIDE OPTICAL TRACKER, and PCT/GB2013/000210 entitled APPARATUS FOR EYE TRACKING, the disclosures of which are herein incorporated by reference in their entireties for all purposes.

In many embodiments of the invention, the resolution-multiplication apparatus is used in a waveguide display that further includes a dynamic focusing element. The dynamic focusing element can be based on the embodiments and teachings of U.S. patent application Ser. No. 15/553,120 entitled ELECTRICALLY FOCUS TUNABLE LENS, the disclosure of which is herein incorporated by reference in its entirety for all purposes. In some embodiments, a dual expansion waveguide display that further includes a dynamic focusing element and an eye tracker can provide a light field display based on the embodiments and teachings disclosed U.S. patent application Ser. No. 15/543,013 entitled HOLOGRAPHIC WAVEGUIDE LIGHT FIELD DISPLAYS, the disclosure of which is herein incorporated by reference in its entirety for all purposes.

In many embodiments, a resolution-multiplication apparatus according to the principles of the invention can be used in a waveguide display integrated within a window, such as but not limited to a windscreen-integrated HUD for road vehicle applications. In some embodiments, the resolution-multiplication apparatus can include gradient index ("GRIN") wave-guiding components for relaying image content between the image projector and the waveguide containing the resolution multiplication gratings. In several embodiments, a resolution-multiplication apparatus can be used in a dual expansion waveguide display incorporating a light pipe for providing beam expansion in one direction based on the embodiments disclosed in U.S. patent application Ser. No. 15/558,409 entitled WAVEGUIDE DEVICE INCORPORATING A LIGHT PIPE, the disclosure of which is herein incorporated by reference in its entirety for all purposes. In a number of embodiments, the input image source in the image projector may be a laser scanner as disclosed in U.S. Pat. No. 9,075,184 entitled COMPACT EDGE ILLUMINATED DIFFRACTIVE DISPLAY, the disclosure of which is herein incorporated by reference in its entirety for all purposes.

In many embodiments, a resolution-multiplication apparatus according to the principles of the invention may be interfaced to an Augmented Reality waveguide display with a field of view of 50 degrees diagonal. Examples of waveguide displays that can be used in applications of the present invention are discussed in the reference documents. Applications of the invention are not necessarily confined to waveguide displays. In some embodiments, the resolution-doubling waveguide can provide a compact image generator for use in any type of wearable or projection display. In several embodiments, the resolution-multiplication apparatus can provide an image projector. In a number of embodiments, the apparatus is optically coupled to one of image display optics, an eyepiece, a projection lens, or a waveguide. In a variety of embodiments, the apparatus forms part of a HMD, a HUD, an eye-slaved display, a dynamic focus display or a light field display. Some of the embodiments and teachings of this disclosure can be applied in waveguide sensors, such as but not limited to eye trackers, fingerprint scanners, and LIDAR systems.

It should be emphasized that the drawings are exemplary and that the dimensions have been exaggerated. For example, thicknesses of the SBG layers have been greatly exaggerated. Optical devices based on any of the above-described embodiments can be implemented using the materials and processes disclosed in PCT Application No.: PCT/GB2012/000680, entitled IMPROVEMENTS TO HOLOGRAPHIC POLYMER DISPERSED LIQUID CRYSTAL MATERIALS AND DEVICES. In some embodiments, the waveguide embodiments can be curved.

Although specific systems and configurations are described above, various embodiments of the invention can be practiced in a wide variety of applications. For example, the following list of patents and patent applications describe many different types of waveguide applications and material systems that can be practiced along with various embodiments of the invention, the disclosures of which are incorporated by reference herein in their entireties for all purposes: U.S. Pat. No. 8,233,204 entitled OPTICAL DISPLAYS, PCT Application No.: US2006/043938, entitled METHOD AND APPARATUS FOR PROVIDING A TRANSPARENT DISPLAY, PCT Application No.: GB2012/000677 entitled WEARABLE DATA DISPLAY, U.S. patent application Ser. No. 13/317,468 entitled COMPACT EDGE ILLUMINATED EYEGLASS DISPLAY, U.S. patent application Ser. No. 15/543,016 entitled ENVIRONMENTALLY ISOLATED WAVEGUIDE DISPLAY, U.S. Pat. No. 8,224,133 entitled LASER ILLUMINATION DEVICE, U.S. Pat. No. 6,115,152 entitled HOLOGRAPHIC ILLUMINATION SYSTEM, PCT Application No.: PCT/GB2013/000005 entitled CONTACT IMAGE SENSOR USING SWITCHABLE BRAGG GRATINGS, U.S. Pat. No. 8,903,207 entitled SYSTEM AND METHOD OF EXTENDING VERTICAL FIELD OF VIEW IN HEAD UP DISPLAY USING A WAVEGUIDE COMBINER, U.S. Pat. No. 8,639,072 entitled COMPACT WEARABLE DISPLAY, U.S. Pat. No. 8,885,112 entitled COMPACT HOLOGRAPHIC EDGE ILLUMINATED EYEGLASS DISPLAY, PCT Application No.: PCT/GB2016/000181, entitled WAVEGUIDE DISPLAY.

While the above description contains many specific embodiments of the invention, these should not be construed as limitations on the scope of the invention, but rather as an example of one embodiment thereof. The construction and arrangement of the systems and methods as shown in the various embodiments are illustrative only. It is therefore to be understood that the present invention may be practiced in ways other than specifically described, without departing from the scope and spirit of the present invention. Although only a few embodiments have been described in detail in this disclosure, many modifications are possible (for example, variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the embodiments without departing from the scope of the present disclosure. Thus, embodiments of the present invention should be considered in all respects as illustrative and not restrictive. Accordingly, the scope of the invention should be determined not by the embodiments illustrated, but by the appended claims and their equivalents.

What is claimed is:

1. An apparatus for multiplying display resolution, the apparatus comprising:
   an image projector for directing light from pixels of a pixelated image source into unique angular directions; and
   at least one switchable grating switchable between diffracting and non-diffracting states optically coupled to the image projector,
   wherein the at least one switchable grating have a first configuration for propagating the light of a native image and at least one configuration for propagating the light of a shifted image with an angular displacement corresponding to the image shift in a predefined direction, and
   wherein the at least one switchable grating comprises first, second, third, fourth gratings, wherein the first and third gratings are configured to couple light from the image projector into an optical path towards the second and fourth gratings, and wherein the second and fourth gratings are configured to couple light towards a user's eye.

2. The apparatus of claim 1, wherein the at least one switchable grating is disposed within at least one waveguide.

3. The apparatus of claim 2, wherein the waveguide further comprises an input coupler, a fold grating, and an output coupler.

4. The apparatus of claim 1, wherein the first configuration is provided by one of the first or third gratings and one of the second or fourth gratings in their diffracting states, and wherein the at least one configuration for propagating shifted image light are provided by at least one other combination of diffracting states of the first, second, third, and fourth gratings.

5. The apparatus of claim 1, wherein the first and second gratings are disposed in a first layer within a waveguide and the third and fourth gratings are disposed in a second layer within the waveguide.

6. The apparatus of claim 1, wherein the first and second gratings are disposed in a first waveguide and the third and fourth gratings are disposed in a second waveguide, wherein the first configuration is provided when the first and second gratings are in their diffracting states, and wherein the at least one configuration for propagating shifted image light is provided when the first and second gratings are in their non-diffracting states.

7. The apparatus of claim 1, wherein the image shift is equal to N+1/2 times a pixel dimension, where N is an integer.

8. The apparatus of claim 1, wherein the native and shifted images are sequentially displayed within a human eye integration period.

9. The apparatus of claim 1, wherein the image shift is one of vertical or horizontal shifts.

10. The apparatus of claim 1, wherein the at least one image shift comprises vertical and horizontal shifts.

11. The apparatus of claim 1, wherein the switchable gratings are recorded in a holographic polymer dispersed, switchable Bragg grating.

12. The apparatus of claim 1, wherein the at least one switchable grating is disposed in a waveguide further comprising a non-switching grating.

13. The apparatus of claim 1, wherein the at least one switchable grating is disposed in a waveguide further comprising a fold grating.

14. Apparatus of claim 1 wherein at least one switchable grating includes at least one grating multiplexing at least one of wavelength or angular bandwidth.

15. The apparatus of claim 1, wherein the apparatus forms part of a HMD, a HUD, an eye-slaved display, a dynamic focus display, or a light field display.

16. The apparatus of claim 1, wherein the image projector further comprises a microdisplay panel.

17. The apparatus of claim 1, wherein the image projector is optically coupled to the first grating and the third grating by one of a prism or grating.

18. The apparatus of claim 1, further comprising an illumination homogenizer.

19. The apparatus of claim 1 wherein at least one of the gratings is a rolled k-vector grating.

* * * * *